US011063994B2

(12) United States Patent
Baldwin et al.

(10) Patent No.: US 11,063,994 B2
(45) Date of Patent: *Jul. 13, 2021

(54) DISTRIBUTING COMMUNICATION OF A DATA STREAM AMONG MULTIPLE DEVICES

(71) Applicant: AT&T Intellectual Property I, L.P., Atlanta, GA (US)

(72) Inventors: Christopher F. Baldwin, Algonquin, IL (US); Bruce Barnes, Pingree Grove, IL (US); Wayne R. Heinmiller, Elgin, IL (US); Patrick Kenny, Barrington, IL (US); Dolores J. Mallian, St. Charles, IL (US)

(73) Assignee: AT&T INTELLECTUAL PROPERTY I, L.P., Atlanta, GA (US)

( * ) Notice: Subject to any disclaimer, the term of this patent is extended or adjusted under 35 U.S.C. 154(b) by 0 days.

This patent is subject to a terminal disclaimer.

(21) Appl. No.: 16/786,525

(22) Filed: Feb. 10, 2020

(65) Prior Publication Data

US 2020/0177653 A1    Jun. 4, 2020

Related U.S. Application Data

(63) Continuation of application No. 15/968,452, filed on May 1, 2018, now Pat. No. 10,560,503, which is a
(Continued)

(51) Int. Cl.
*H04L 29/06* (2006.01)
*H04L 12/707* (2013.01)
*H04W 88/02* (2009.01)

(52) U.S. Cl.
CPC .......... *H04L 65/4069* (2013.01); *H04L 45/24* (2013.01); *H04L 65/4076* (2013.01); *H04L 65/605* (2013.01); *H04W 88/02* (2013.01)

(58) Field of Classification Search
CPC ... H04L 65/4069; H04L 45/24; H04L 65/605; H04L 65/4076
(Continued)

(56) References Cited

U.S. PATENT DOCUMENTS 5,546,379 A   8/1996  Thaweethai et al.
5,781,189 A   6/1998  Holleran et al.
(Continued)

FOREIGN PATENT DOCUMENTS

WO    9951001    10/1999

OTHER PUBLICATIONS

United States Patent and Trademark Office, "Non-final Office Action," mailed in connection with U.S. Appl. No. 10/125,069, dated Jun. 15, 2005, 9 pages.
(Continued)

*Primary Examiner* — David R Lazaro
*Assistant Examiner* — Zia Khurshid
(74) *Attorney, Agent, or Firm* — Amin, Turocy & Watson, LLP

(57) ABSTRACT

Methods, apparatus and articles of manufacture for distributing communication of a data stream among multiple devices are disclosed. Example methods disclosed herein include sending a message from a first electronic device to a second electronic device to announce the first electronic device is available for inclusion in a shared connection to be established by the second electronic device with a service provider, the shared connection to split a first data stream from a source into a plurality of partial data streams to be distributed among a plurality of electronic devices. Disclosed example methods also include establishing a data connection with the service provider to receive a first one of the partial data streams associated with the shared connection. Disclosed example methods further include relaying
(Continued)

the first one of the partial data streams associated with the shared connection from the service provider to the second electronic device.

20 Claims, 9 Drawing Sheets

Related U.S. Application Data continuation of application No. 15/141,513, filed on Apr. 28, 2016, now Pat. No. 9,973,556, which is a continuation of application No. 13/563,218, filed on Jul. 31, 2012, now Pat. No. 9,356,980.

(58) Field of Classification Search
USPC .......................................................... 709/219
See application file for complete search history.

(56) References Cited

U.S. PATENT DOCUMENTS

| | | | |
|---|---|---|---|
| 5,991,735 | A | 11/1999 | Gerace |
| 6,076,109 | A | 6/2000 | Kikinis |
| 6,085,220 | A | 7/2000 | Courts et al. |
| 6,128,663 | A | 10/2000 | Thomas |
| 6,167,441 | A | 12/2000 | Himmel |
| 6,243,761 | B1 | 6/2001 | Mogul et al. |
| 6,247,048 | B1 | 6/2001 | Greer et al. |
| 6,247,050 | B1 | 6/2001 | Tso et al. |
| 6,336,137 | B1 | 1/2002 | Lee et al. |
| 6,345,279 | B1 | 2/2002 | Li et al. |
| 6,345,298 | B1 | 2/2002 | Moriya |
| 6,353,849 | B1 | 3/2002 | Linsk |
| 6,360,249 | B1 | 3/2002 | Courts et al. |
| 6,360,273 | B1 | 3/2002 | Beurket et al. |
| 6,412,008 | B1 | 6/2002 | Fields et al. |
| 6,421,733 | B1 | 7/2002 | Tso et al. |
| 6,434,563 | B1 | 8/2002 | Pasquali et al. |
| 6,470,378 | B1 | 10/2002 | Tracton et al. |
| 6,486,892 | B1 | 11/2002 | Stern |
| 6,553,410 | B2 | 4/2003 | Kikinis |
| 6,564,259 | B1 | 5/2003 | Baber et al. |
| 6,742,043 | B1 | 5/2004 | Moussa et al. |
| 6,760,916 | B2 | 7/2004 | Holtz et al. |
| 6,772,396 | B1 | 8/2004 | Cronin et al. |
| 6,832,241 | B2 | 12/2004 | Tracton et al. |
| 6,892,226 | B1 | 5/2005 | Tso et al. |
| 6,938,077 | B2 | 8/2005 | Sanders |
| 6,959,318 | B1 | 10/2005 | Tso |
| 7,114,160 | B2 | 9/2006 | Suryanarayana et al. |
| 7,149,964 | B1 | 12/2006 | Cottrille et al. |
| 7,519,720 | B2 | 4/2009 | Fishman et al. |
| 7,568,201 | B2 | 7/2009 | Suryanarayana et al. |
| 7,596,645 | B1 | 9/2009 | Hillebrand |
| 7,688,730 | B2 | 3/2010 | Beadle |
| 7,720,098 | B1 | 5/2010 | Allen et al. |
| 7,860,081 | B2 | 12/2010 | Dawson et al. |
| 7,894,470 | B2 | 2/2011 | Ruckart |
| 7,894,828 | B2 | 2/2011 | Dawson et al. |
| 7,917,390 | B2 | 3/2011 | Feinberg |
| 8,068,450 | B2 | 11/2011 | Kozisek |
| 8,121,891 | B2 | 2/2012 | Handel et al. |
| 8,150,938 | B1 | 4/2012 | Walsh et al. |
| 8,170,056 | B2 | 5/2012 | Allen et al. |
| 8,190,769 | B1 | 5/2012 | Shukla et al. |
| 8,327,127 | B2 | 12/2012 | Suryanarayana et al. |
| 8,621,197 | B2 | 12/2013 | Suryanarayana et al. |
| 9,137,301 | B1 | 9/2015 | Dunlap et al. |
| 9,356,980 | B2 | 5/2016 | Baldwin et al. |
| 9,444,726 | B2 | 9/2016 | Baldwin |
| 9,491,093 | B2 | 11/2016 | Baldwin |
| 9,737,301 | B2 | 8/2017 | Baber et al. |
| 10,142,384 | B2 | 11/2018 | Baldwin |
| 10,560,503 | B2 | 2/2020 | Baldwin et al. |
| 2001/0048728 | A1 | 12/2001 | Peng |
| 2001/0048735 | A1 | 12/2001 | O'Neal |
| 2002/0004788 | A1 | 1/2002 | Gros et al. |
| 2002/0010803 | A1 | 1/2002 | Oberstein et al. |
| 2002/0010867 | A1 | 1/2002 | Schaefer et al. |
| 2002/0016801 | A1 | 2/2002 | Reiley et al. |
| 2002/0021669 | A1 | 2/2002 | Kunito et al. |
| 2002/0054090 | A1 | 5/2002 | Silva et al. |
| 2002/0071480 | A1 | 6/2002 | Marjelund et al. |
| 2002/0091843 | A1* | 7/2002 | Vaid .................. H04L 12/2865 709/230 |
| 2002/0103935 | A1 | 8/2002 | Fishman et al. |
| 2003/0054799 | A1 | 3/2003 | Shin |
| 2003/0200283 | A1 | 10/2003 | Suryanarayana et al. |
| 2003/0225726 | A1 | 12/2003 | Simpson et al. |
| 2004/0071133 | A1 | 4/2004 | Yusko et al. |
| 2004/0205561 | A1 | 10/2004 | Gibbs et al. |
| 2005/0021621 | A1 | 1/2005 | Welch et al. |
| 2005/0025163 | A1 | 2/2005 | Christie, IV |
| 2005/0074017 | A1 | 4/2005 | Qian et al. |
| 2005/0262220 | A1 | 11/2005 | Ecklund et al. |
| 2006/0046686 | A1 | 3/2006 | Hawkins et al. |
| 2006/0070115 | A1 | 3/2006 | Yamada et al. |
| 2006/0116149 | A1 | 6/2006 | Dunn et al. |
| 2006/0168290 | A1 | 7/2006 | Doron |
| 2006/0174160 | A1 | 8/2006 | Kim |
| 2006/0282767 | A1 | 12/2006 | Suryanarayana et al. |
| 2007/0050522 | A1 | 3/2007 | Grove et al. |
| 2007/0127386 | A1 | 6/2007 | Joshi et al. |
| 2007/0136452 | A1* | 6/2007 | Coleman .............. H04L 65/605 709/223 |
| 2007/0147438 | A1 | 6/2007 | Lok |
| 2008/0075111 | A1 | 3/2008 | Hu et al. |
| 2008/0175188 | A1 | 7/2008 | Kozisek |
| 2008/0195738 | A1 | 8/2008 | Luo |
| 2008/0262974 | A1 | 10/2008 | Kozisek |
| 2008/0269297 | A1 | 10/2008 | Bohlin et al. |
| 2008/0281971 | A1 | 11/2008 | Leppanen et al. |
| 2008/0299988 | A1 | 12/2008 | Dawson et al. |
| 2008/0301017 | A1 | 12/2008 | Dawson et al. |
| 2009/0046740 | A1 | 2/2009 | Ruckart |
| 2009/0083426 | A1 | 3/2009 | Cagenius |
| 2009/0182813 | A1 | 7/2009 | McCartie et al. |
| 2009/0260019 | A1 | 10/2009 | Suranarayana et al. |
| 2010/0061401 | A1 | 3/2010 | Nakahira |
| 2010/0287296 | A1 | 11/2010 | Riggert et al. |
| 2010/0293097 | A1 | 11/2010 | Pomeroy |
| 2010/0318662 | A1 | 12/2010 | Wie et al. |
| 2011/0110324 | A1 | 5/2011 | Ruckart |
| 2011/0249621 | A1 | 10/2011 | Harris et al. |
| 2012/0246301 | A1 | 9/2012 | Vyrros et al. |
| 2013/0014128 | A1 | 1/2013 | Suryanarayana et al. |
| 2013/0044744 | A1 | 2/2013 | Voglewede et al. |
| 2013/0114426 | A1 | 5/2013 | Polk et al. |
| 2013/0142040 | A1 | 6/2013 | Fryer et al. |
| 2014/0040364 | A1 | 2/2014 | Baldwin et al. |
| 2014/0040421 | A1 | 2/2014 | Baldwin |
| 2014/0040493 | A1 | 2/2014 | Baldwin |
| 2014/0108517 | A1 | 4/2014 | Suryanarayana et al. |
| 2014/0110324 | A1 | 4/2014 | Lehoux et al. |
| 2015/0248485 | A1 | 9/2015 | Sagy et al. |
| 2016/0248826 | A1 | 8/2016 | Baldwin et al. |

OTHER PUBLICATIONS

United States Patent and Trademark Office, "Non-final Office Action," mailed in connection with U.S. Appl. No. 10/125,069, dated Nov. 23, 2005, 10 pages.

United States Patent and Trademark Office, "Notice of Allowance," mailed in connection with U.S. Appl. No. 10/158,069, dated May 16, 2006, 4 pages.

United States Patent and Trademark Office, "Non-final Office Action," mailed in connection with U.S. Appl. No. 11/502,087, dated Dec. 11, 2006, 8 pages.

United States Patent and Trademark Office, "Non-final Office Action," mailed in connection with U.S. Appl. No. 11/502,087, dated May 31, 2007, 12 pages.

United States Patent and Trademark Office, "Non-final Office Action,"

(56) References Cited

OTHER PUBLICATIONS mailed in connection with U.S. Appl. No. 11/502,087, dated Dec. 21, 2007, 8 pages.
United States Patent and Trademark Office, "Non-final Office Action," mailed in connection with U.S. Appl. No. 11/502,087, dated Jul. 8, 2008, 4 pages.
United States Patent and Trademark Office, "Non-final Office Action," mailed in connection with U.S. Appl. No. 11/502,087, dated Dec. 31, 2008, 5 pages.
United States Patent and Trademark Office, "Notice of Allowance," mailed in connection with U.S. Appl. No. 11/502,087, dated May 8, 2009, 4 pages.
United States Patent and Trademark Office, "Non-Final Office Action," mailed in connection with U.S. Appl. No. 12/490,791, dated Dec. 15, 2011, 12 pages.
United States Patent and Trademark Office, "Final Office Action," mailed in connection with U.S. Appl. No. 12/490,791, dated Apr. 16, 2012, 5 pages.
United States Patent and Trademark Office, "Notice of Allowance," mailed in connection with U.S. Appl. No. 12/490,791, dated Aug. 2, 2013, 8 pages.
United States Patent and Trademark Office, "Non-Final Office Action," mailed in connection with U.S. Appl. No. 13/619,506, dated Dec. 27, 2012, 7 pages.
United States Patent and Trademark Office, "Final Office Action," mailed in connection with U.S. Appl. No. 13/619,506, dated May 29, 2013, 12 pages.
United States Patent and Trademark Office, "Notice of Allowance," mailed in connection with U.S. Appl. No. 13/619,506, dated Aug. 23, 2013, 6 pages.
United States Patent and Trademark Office, "Non-Final Office Action," mailed in connection with U.S. Appl. No. 13/311,462, dated Feb. 19, 2014, 26 pages.
United States Patent and Trademark Office, "Final Office Action," mailed in connection with U.S. Appl. No. 13/311,462, dated Jun. 13, 2014, 31 pages.
United States Patent and Trademark Office, "Non-Final Office Action," mailed in connection with U.S. Appl. No. 13/563,234, dated Apr. 17, 2014, 13 pages.
United States Patent and Trademark Office, "Final Office Action," mailed in connection with U.S. Appl. No. 13/563,225, dated Mar. 2, 2105, 16 pages.
United States Patent and Trademark Office, "Final Office Action," mailed in connection with U.S. Appl. No. 13/563,234, dated Sep. 22, 2015, 17 pages.
United States Patent and Trademark Office, "Final Office Action," mailed in connection with U.S. Appl. No. 13/563,225, dated Jan. 20, 2016, 17 pages.
United States Patent and Trademark Office, "Non-Final Office Action," mailed in connection with U.S. Appl. No. 13/563,225, dated Jul. 20, 2015, 16 pages.
United States Patent and Trademark Office, "Non-Final Office Action," mailed in connection with U.S. Appl. No. 13/563,234, dated May 19, 2015, 11 pages.
United States Patent and Trademark Office, "Non-Final Office Action," mailed in connection with U.S. Appl. No. 13/563,225, dated Aug. 28, 2014, 15 pages.
United States Patent and Trademark Office, "Final Office Action," mailed in connection with U.S. Appl. No. 13/563,234, dated Sep. 29, 2014, 11 pages.
United States Patent and Trademark Office, "Notice of Allowance," mailed in connection with U.S. Appl. No. 13/311,462, dated Oct. 30, 2014, 8 pages.
United States Patent and Trademark Office, "Non-Final Office Action," mailed in connection with U.S. Appl. No. 13/562,218, dated Jan. 23, 2014, 18 pages.
United States Patent and Trademark Office, "Final Office Action," mailed in connection with U.S. Appl. No. 13/563,218 dated Aug. 20, 2014, 19 pages.
United States Patent and Trademark Office, "Non-Final Office Action," mailed in connection with U.S. Appl. No. 13/563,218 dated Jun. 10, 2015, 22 pages.
United States Patent and Trademark Office, "Notice of Allowance," mailed in connection with U.S. Appl. No. 13/563,218, dated Jan. 29, 2016, 15 pages.
United States Patent and Trademark Office, "Notice of Allowance," mailed in connection with U.S. Appl. No. 13/563,225 dated Jun. 21, 2016, 8 pages.
United States Patent and Trademark Office, "Notice of Allowance," mailed in connection with U.S. Appl. No. 13/563,234 dated May 5, 2016, 15 pages.
United States Patent and Trademark Office, "Non-Final Office Action," mailed in connection with U.S. Appl. No. 15/270,894, dated May 26, 2017, 19 pages.
United States Patent and Trademark Office, "Final Office Action," mailed in connection with U.S. Appl. No. 15/270,894, dated Oct. 19, 2017, 19 pages.
United States Patent and Trademark Office, "Non-Final Office Action," mailed in connection with U.S. Appl. No. 15/261,452, dated Aug. 11, 2017, 31 pages.
United States Patent and Trademark Office, "Notice of Allowance," mailed in connection with U.S. Appl. No. 15/141,513 dated Jan. 10, 2018, 46 pages.
United States Patent and Trademark Office, "Final Office action," mailed in connection with U.S. Appl. No. 15/141,513 dated Jul. 21, 2017, 50 pages.
United States Patent and Trademark Office, "Non-Final Office action," mailed in connection with U.S. Appl. No. 15/141,513 dated Jan. 26, 2017, 44 pages.
Adtran, "Why Buy Atlas Video Switch, Atlas 800 Series," 2004, 2 pages.
Kear, "Dual Wan Router—How to Load Balance Using Sen," http://skear.hubpages.com/hub/Dual-Wan-Router-How-To-Build-One-On-a-Budget, accessed on Nov. 29, 2011, 7 pages.
Vicomsoft, "Bandwidth Aggregation, Bonding and Teaming," http://www.vicomsoft.us/learning-center/bandwidthaggregation-bonding-and-teaming/, accessed on Nov. 29, 2011, 14 pages.
Wikipedia, "Channel Bonding," http://en.wikipedia.org/wiki/Channel_bonding, accessed on Apr. 10, 2012, 2 pages.
Wikipedia, "Link Aggregation," http://en.wikipedia.org/wiki/Link_aggregation, accessed on Apr. 10, 2012, 8 pages.
Wikipedia, "Stackable Switch," http://en.wikipedia.org/wiki/Stackable_switch, accessed on Nov. 29, 2011, 3 pages.
United States Patent and Trademark Office, "Non-final Office Action," mailed in connection with U.S. Appl. No. 15/270,894, dated Feb. 16, 2018, 19 pages.
United States Patent and Trademark Office, "Final Office Action," mailed in connection with U.S. Appl. No. 15/270,894, dated Aug. 8, 2018, 11 pages.
United States Patent and Trademark Office, "Final Office Action," mailed in connection with U.S. Appl. No. 15/261,452, dated Mar. 1, 2018, 29 pages.
United States Patent and Trademark Office, "Notice of Allowance," mailed in connection with U.S. Appl. No. 15/261,452, dated Jul. 16, 2018, 18 pages.
United States Patent and Trademark Office, "Non-final Office Action," mailed in connection with U.S. Appl. No. 15/968,452, dated Nov. 27, 2018, 26 pages.
United States Patent and Trademark Office, "Non-Final Office Action," mailed in connection with U.S. Appl. No. 16/198,448, dated Nov. 8, 2019, 12 pages.
United States Patent and Trademark Office, "Supplemental Notice of Allowability," mailed in connection with U.S. Appl. No. 15/968,452, dated Jan. 17, 2020, 2 pages.
United States Patent and Trademark Office, "Notice of Allowance," mailed in connection with U.S. Appl. No. 15/968,452, dated Sep. 5, 2019, 8 pages.
United States Patent and Trademark Office, "Final Office Action," mailed in connection with U.S. Appl. No. 15/968,452, dated Jun. 21, 2019, 14 pages.

(56) References Cited

OTHER PUBLICATIONS

United States Patent and Trademark Office, "Notice of Allowance," mailed in connection with U.S. Appl. No. 16/198,448, dated Feb. 18, 2020, 8 pages.

U.S. Appl. No. 13/311,462, "Pooling Available Network Bandwidth From Multiple Devices," filed Dec. 5, 2012 (38 pages).

* cited by examiner

DISTRIBUTING COMMUNICATION OF A DATA STREAM AMONG MULTIPLE DEVICES

RELATED APPLICATIONS

This patent arises from a continuation of U.S. patent application Ser. No. 15/968,452 (now U.S. Pat. No. 10,560,503), which was filed May 1, 2018, which is a continuation of U.S. patent application Ser. No. 15/141,513 (now U.S. Pat. No. 9,973,556), which was filed Apr. 28, 2016, which is a continuation of U.S. patent application Ser. No. 13/563,218 (now U.S. Pat. No. 9,356,980), which was filed Jul. 31, 2012. U.S. patent application Ser. No. 15/968,452, U.S. patent application Ser. No. 15/141,513 and U.S. patent application Ser. No. 13/563,218 are hereby incorporated by reference into this application as if set forth herein in full and priority to U.S. patent application Ser. No. 15/968,452, U.S. patent application Ser. No. 15/141,513 and to U.S. patent application Ser. No. 13/563,218 is hereby claimed.

FIELD OF THE DISCLOSURE

This disclosure relates generally to data communications and, more particularly, to distributing communication of a data stream among multiple devices.

BACKGROUND

Consumers are becoming accustomed to near ubiquitous access to Internet-based and web-based services and applications. In the past, data intensive applications, such as steaming video, on-demand video, video conferencing, etc., were limited to devices, such as personal computers, set-top boxes, stand-alone video conferencing systems, etc., having dedicated, high-speed (e.g., broadband) data connections provided by an Internet service provider (ISP). Today, consumers have access to a plethora of electronic devices, including smartphones, tablet computers, personal data devices, personal digital assistants, etc., that support Internet connectivity, and may have sufficient processing power to support at least some media-rich applications. However, while a consumer may own or have access to a number of such electronic devices, the data bandwidth capabilities of each individual device may be limited such that none of the consumer's devices, on its own, can support the data transfer speeds associated with a data intensive application the consumer wishes to access.

BRIEF DESCRIPTION OF THE DRAWINGS

Wherever possible, the same reference numbers will be used throughout the drawing(s) and accompanying written description to refer to the same or like elements, parts, etc.

DETAILED DESCRIPTION

Figure 1:
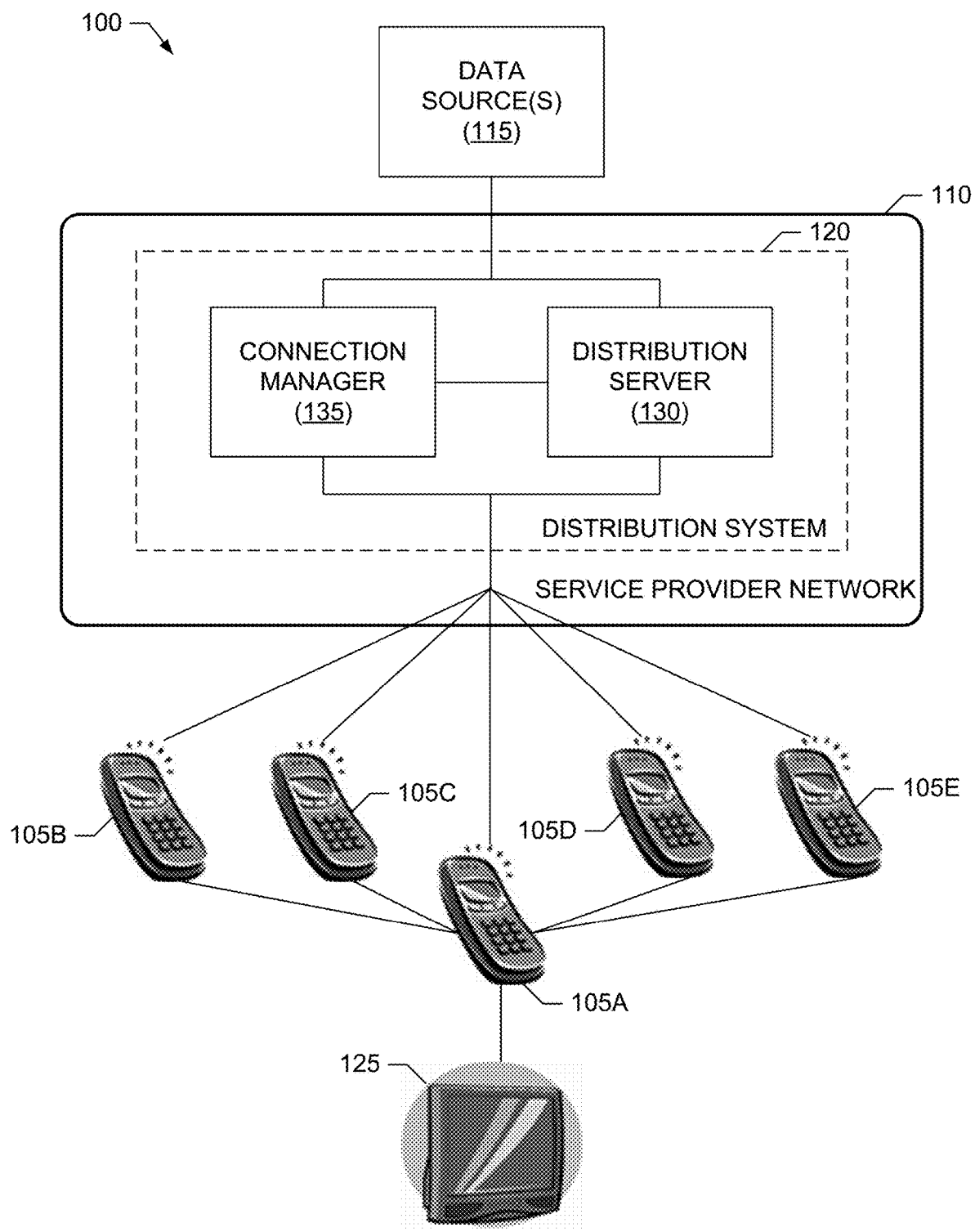
FIG. 1 is block diagram of an example communication system capable of distributing communication of a data stream among multiple example devices as disclosed herein.

Methods, apparatus and articles of manufacture (e.g., storage media) for distributing communication of a data stream among multiple devices are disclosed herein. Example methods disclosed herein to distribute communication of a first data stream among multiple devices include receiving a request from one of a group of example devices to establish a shared connection to distribute the communication of the first data stream among the group of devices. Such example methods also include establishing, in response to the request, respective data connections with the group of devices based on device capability information obtained from an example system (such as an example mobile communication system) providing service for the group of devices. Such example methods further include splitting the first data stream into a group of partial data streams to be communicated to the group of devices via the respective data connections. In such examples, the partial data streams, when aggregated, form the first data stream.

In some such example methods, the request includes identification information identifying the group of devices (e.g., the secondary devices described in greater detail below) other than the first one of the group of devices from which the request is received (e.g., the primary device described in greater detail below). For example, the identification information can include at least one of a telephone number or a uniform resource identifier for each of the group of devices (e.g., the secondary devices) other than the first one (e.g., the primary device). Additionally or alternatively, some such example methods further include contacting the group of devices (e.g., the secondary devices), other than the first one (e.g., the primary device), based on the identification information to initiate establishing of the respective data connections with the group of devices (e.g., the secondary devices) other than the first one (e.g., the primary device). In such examples, it may be assumed that a data connection is already established with the first one of the group of devices from which the request is received (e.g., the primary device), because such a data connection would already be established in order to enable reception of the request.

Additionally or alternatively, some such example methods further include associating respective one or more data transmission characteristics with each of the data connections based on the device capability information associated with each of the group of devices. For example, the respective one or more data transmission characteristics can include at least one of a respective bandwidth limit or a respective data rate limit associated with each of the data connections. Also, in some such examples, the system (which may be a mobile communication system) receives the device capability information via control signaling from each of the plurality of devices.

Additionally or alternatively, some such example methods further include detecting a change in status of the shared connection. Such example methods can also include adjusting the splitting of the first data stream to account for the change in status.

Further example methods, apparatus and articles of manufacture (e.g., storage media) for distributing communication of a data stream among multiple devices are described in greater detail below.

As noted above, a consumer may have access to multiple electronic devices that support Internet connectivity, but none of these devices may have sufficient data bandwidth capability, on its own, to support the data intensive applications the consumer may wish to access. For example, a lack of sufficient data bandwidth may prevent a consumer from using a given one of her electronic devices to view a streaming video, participate in a video conference, etc., or may at least degrade the consumer's experience when accessing such applications. In many circumstances, the consumer has access to a number of electronic devices having a combined bandwidth that would be sufficient to support the desired data intensive application. Thus, while the total bandwidth available to the consumer would be sufficient, the distribution of this bandwidth among multiple, individual devices (e.g., which may be of different types) has, in the past, prevented this available bandwidth from being used to its full potential.

Example methods, apparatus and articles of manufacture disclosed herein can overcome at least some of these prior limitations, and enable the bandwidth from multiple devices to be combined. For example, such disclosed example methods, apparatus and articles of manufacture distribute communication of a data stream (e.g., such as a high-speed data stream corresponding to a streamlining video application, a video conferencing application, etc.) among the multiple devices, thereby enabling the limited bandwidth of each device to be combined to realize a data connection (referred to herein as a shared connection) having a higher overall bandwidth. Prior techniques for combining the bandwidth of separate communication links, such as link bonding or aggregation, can be limited in that they are restricted to use with fixed, or static, communication links implemented using the same technology and/or provided by the same service provider, and/or require the communication links being combined to terminate at the same communication endpoint.

Unlike such prior techniques, example methods, apparatus and articles of manufacture disclosed herein enable distribution of the communication of a data stream among multiple, different endpoints (e.g., electronic devices), which may be the same or different and which may receive service (e.g., Internet service) from the same or different providers. Also, example methods, apparatus and articles of manufacture disclosed herein support distribution of the data stream among different data connections in accordance with the different device capabilities of the devices with which the data connections are established. Furthermore, example methods, apparatus and articles of manufacture disclosed herein support flexible combining of device bandwidth such that, for example, devices may be added to and/or removed from the shared connection while the data stream is still being communication. Further aspects of the disclosed example methods, apparatus and articles of manufacture are described in greater detail below.

Turning to the figures, a block diagram of an example communication system 100 capable of distributing communication of a data stream among multiple example devices as disclosed herein is illustrated in FIG. 1. The communication system 100 includes multiple example user devices 105A-E in communication with an example service provider network 110. The service provider network 110 can correspond to any type of service provider's network, such as a mobile service provide network, a broadband service provider network, a cable service provider network, a satellite service provider network, an Internet service provider (ISP) network, etc., capable of providing access to the Internet and/or any service-oriented and/or content delivery network. In the example communication system 100 of FIG. 1, the same service provider network 110 provides Internet service to each of the multiple user devices 105A-E. However, the user devices 105A-E may have different device capabilities such that, for example, some or all of the user devices 105A-E have different respective bandwidth or data rate limits for data received from and/or transmitted to the service provider network 110.

Although the user devices 105A-E are depicted as mobile phones in FIG. 1, the user devices 105A-E are not limited thereto. For example, the user devices 105A-E can each be any device that is capable of accessing the service provider 110, which in turn provides access to the Internet and/or any other type(s) of content delivery and/or service-oriented network(s). Each user device 105A-E is also able to exchange data with other external device(s), such as via tethering and/or any external data connection (such as a Wi-Fi connection, a Bluetooth connection, a universal serial bus (USB) connection, a docking connection, etc.). As such, the user devices 105A-E can be implemented by, for example, mobile phones (such as smartphones, cellular phones, 3G, 4G or long term evolution (LTE) wireless devices, etc.), wireless access points (such as Wi-Fi devices, Bluetooth devices, aircards, etc.), personal data devices (such as personal digital assistants (PDAs), e-readers, etc.), broadband modems (such as DSL modems, cable modems, satellite modems, etc.) and/or any other type(s) of electronic devices or combinations thereof.

In the illustrated example of FIG. 1, the service provider network 110 provides the user devices 105A-E with access to one or more example data sources 115. The data sources(s) 115 include, for example, one or more streaming media sources (e.g., such as streaming services offered by Netflix®, Hulu®, etc.), one or more on-demand media download sources (e.g., such as Apple iTunes®), one or more video conferencing services, etc. The data source(s) 115 can also include other user devices (not shown) capable of uploading content (e.g., such as video chat content) that is able to be received by the user devices 105A-E.

The service provider network 110 further includes an example distribution system 120 that enables the communication of a particular data stream from the data sources(s) 115 to be distributed among the multiple user devices 105A-E. For example, the distribution system 120 may be used to distribute portions of a data stream, which is being communicated from a data source 115 to one of the user devices 105A-E, such as the user device 105A, to some or all of the multiple user devices 105A-E. As described in greater detail below, the partial data streams received by some or all of the user devices 105A-E are then aggregated to form the original data stream, which may be processed by the user device 105A (e.g., for presentation by the user device 105A) and/or forwarded to an example output device 125 (e.g., for presentation by the output device 125). In this way, the individual bandwidths and/or data transmission capacity limits of each of the user devices 105A-E can be combined to yield an aggregated bandwidth and/or data transmission capacity capable of carrying a data stream that would not have been supported by the user devices 105A-E otherwise. The output device 125 of the illustrated example can be implemented by any type of device capable of processing, presenting and/or otherwise using a data stream, such as a television, a set-top box, a personal computer, etc., and/or any other type of user device, such as device similar to the user devices 105A-E described above.

To support distributing communication of a data stream among the multiple user devices 105A-E as disclosed herein, the distribution system 120 of the illustrated example further includes an example distribution server 130 and an example connection manager 135. As described in greater detail below, the distribution server 130 is responsible for splitting a complete data stream being provided by a data source 115 into multiple partial data stream to be communicated to the respective user devices 105A-E. As described in greater detail below, the connection manager 135 is responsible for establishing, monitoring and otherwise managing the data connections with the user devices 105A-E that collectively form the shared connection via which the original data stream is communicated as a group of partial data stream to the user devices 105A-E.

In the example communication system 100 of FIG. 1, the distribution system 120, which includes the distribution server 130 and the connection manager 135, is included in the service provider network 110. Accordingly, the distribution server 130 and/or the connection manager 135 can be implemented by one or more servers, devices, etc., implementing the service provider network 110. For example, if the service provider network 110 includes an example Internet protocol (IP) multimedia subsystem (IMS), then either or both of the distribution server 130 and/or the connection manager 135 can be implemented by one or more application servers included in the IMS of the service provider network 110.

An example of distributing communication of a data stream among the multiple user devices 105A-E in the context of the communication system 100 is now described. Consider, for example, a scenario in which a user endeavors to use the user device 105A to access a data source 115 to begin data streaming or downloading using data stream distribution as disclosed herein. In such examples, the user device 105A is referred to herein as a primary device and is responsible for establishing the shared connection between the user devices 105A-E, managing the shared connection, selecting the target data source 115, etc. The other user devices 105B-E are referred to herein as secondary devices to be included in the shared connection that is to convey the data stream from the selected data source 115 to the user devices 105A-E.

In such examples, the user uses the primary device 105A to establish local communication links with one or more of the secondary user devices 105B-E. For convenience, and without loss of generality, it is assumed that all of the user devices 105A-E are to be included in the shared connection. For example, the user devices 105A-E can establish an ad-hoc network, tethering connections and/or other local communication links via any appropriate technology, such as Wi-Fi connections, Bluetooth connections, USB connections, a docking connections, etc. In the illustrated example, the primary device 105A also obtains identification information identifying the secondary user devices 105B-E to be included in the shared connection. The primary device 105A then sends a shared connection request, for receipt by the distribution system 120, requesting that a shared connection be established to distribute a data stream from a target data source 115. In the illustrated example, the shared connection request identifies the target data source 115 and includes the identification information obtained for the secondary user devices 105B-E.

In the example communication system 100 of FIG. 1, the distribution system 120 is implemented in the service provider network 110. Accordingly, the distribution system 120 is able to take advantage of features of the service provider network 110 to establish the shared connection among the user devices 105A-E. For example, the service provider network 110 can receive the shared connection request from the primary device 105A and use the secondary device identification information (e.g., such a device phone number(s), uniform resource identifier(s), etc.) included therein to establish data connections (also referred to herein as secondary data connections) with the secondary devices 105B-E. (It is assumed that a data connection, also referred to herein as a primary data connection, is already established with the primary device 105A as the request is received as a data communication from the primary device 105A.) In some examples, such as when the service provider network 110 corresponds to a 3G and/or 4G mobile service provider network, the service provider network 110 can request and receive device capability information from the secondary devices 105B-E via control signaling when the data connections are being established with the secondary devices 105B-E. (It is assumed that the service provider network 110 has already obtained the device capability information for the primary device 105A prior to establishing the data connection via which the shared connection request was received.) Such device capability information can include, for example, information related to a bandwidth limit and/or data rate limit supported by each device 105A-E.

Next, the service provider network 110 forwards the shared connection request to the distribution system 120 and, in particular, the connection manager 135 of the illustrated example. The connection manager 135 further establishes the data connections with the devices 105A-E by associating respective data transmission characteristic(s) with each of the data connections. In the illustrate example, the data transmission characteristic(s) are determined by the connection manager 135 based on the device capability information obtained from the service provider network 110. For example, the connection manager 135 can allocate different bandwidth and/or data rate limits to some or all of the data connections based on the device capability information for each of the devices 105A-E. After establishing the data connections with the respective devices 105A-E and determining their respective data transmission characteristics, the connection manager 135 then initiates the data stream from target data source 115 using the target data source identification information included in the shared connection request. The connection manager 135 also invokes the distribution server 130 to begin splitting of the complete data stream among the respective data connections with the user devices 105A-E.

In the illustrated example, the distribution server 130 receives the complete data stream from the target data source 115 corresponding to the target data source identification information included in the shared connection request. The distribution server 130 splits the complete data stream into partial data streams to be communicated to the user devices 105A-E using the communication paths established by the connection manager 135 and the service provider network 110. In some examples, the distribution server 130 generates the partial data streams having different data transmission characteristics, such as different bandwidth limits and/or data rate limits, according to the respective data transmission characteristics associated with the communication paths established with the user devices 105A-E. In some examples, the distribution server 130 may also perform transcoding to change/modify one or more data stream characteristics when splitting the complete data stream into the partial data streams, as described in greater detail below.

In the illustrated example, the user devices 105A-E receive their respective partial bit streams from the distribution server 130 via the established communication paths. The received partial bits streams are then aggregated (e.g., possibly after reordering to account for different data packet arrival times at the different user devices 105A-E) to form the complete data stream being provided by the target data source 115. Any appropriate aggregation technique can be employed in the communication system 100 to aggregate the partial data streams received by the user devices 105A-E. For example, as illustrated in the example of FIG. 1, the secondary devices 105B-E can forward their respective received partial data streams to the primary device 105A via the local communication links previously established (as described above) between the user devices 105A-E. In such examples, the primary device 105A aggregates the partial data streams received from the secondary devices 105B-E with its own received partial data stream to form the complete data stream being provided by the target data source 115. The primary device 105A can the process/present the complete data stream itself, or convey the complete data stream to the output device 125 for processing/presentation.

Additionally or alternatively, in some examples, the user devices 105A-E support hierarchical aggregation of the partial data streams to form the complete data stream provided by the target data source 115. In such examples, subsets of the user devices 105A-E work cooperatively to perform a first level of data stream aggregation (e.g., which can be performed in parallel among the different device subsets). For example, the secondary device 105B could perform aggregation of the partial data streams received by the secondary devices 105B-C, and the secondary device 105D could perform aggregation of the partial data streams received by the secondary devices 105D-E. The resulting aggregated streams from the first level of aggregation can then be provided to another device, such as the primary device 105A, to perform a next level of data stream aggregation. Additional levels of aggregation can be implemented, as appropriate.

Additionally or alternatively, in some examples, the user devices 105A-E provide their respective received partial data streams to the output device 125, which is responsible for performing the data stream aggregation.

In some examples, the connection manager 135 and/or the primary device 105 of the communication system 100 monitor the status of the shared connection established between the distribution system and the user devices 105A-E to determine whether to modify distribution of the complete data stream among the multiple devices 105A-E. For example, if one or more of the user devices 105A-E is/are no longer available (e.g., due to leaving the operating area, being turned-off, etc.), the connection manager 135 and/or the primary device 105 can detect such a change and cause the complete data stream to be distributed just over the remaining user devices 105A-E. Additionally or alternatively, a new user device (not shown) may become available (e.g., by entering the operating area, by being turned on, etc.) for inclusion in the group of devices 105A-E among which the complete data stream is to be distributed. In some examples, the connection manager 135 and/or the primary device 105 can detect such a change and cause the complete data stream to be distributed over the new group user devices 105A-E. Such monitoring capabilities enables the communication system 100 to continue providing the complete data stream from the target data source to the user devices 105A-E even as the composition of the user devices 105A-E changes.

Although five user devices 105A-E are illustrated in the example of FIG. 1, the communication system 100 can support distributing the communication of a data stream among any number of user devices 105A-E. The communication system 100 can also support any number and/or type(s) of data sources 115 and output devices 125. Furthermore, the communication system 100 can include any number of service provider networks 110 providing the user devices 105A-E with access to the Internet and/or any other service oriented and/or content delivery network(s). Moreover, although one distribution system 120 is illustrated in the example of FIG. 1, the communication system 100 can support any number of distribution systems 120 to distribute communication of data streams among multiple devices as disclosed herein.

Figure 2:
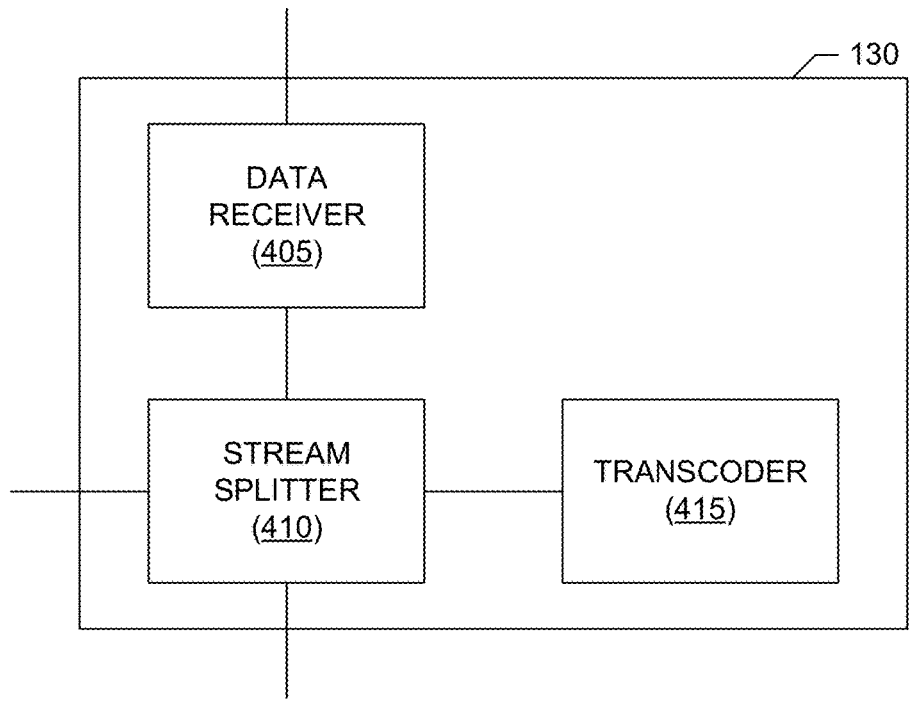
FIG. 2 is block diagram of an example distribution server that may be used to implement the example communication system of FIG. 1.

A block diagram depicting an example implementation of the distribution server 130 of FIG. 1 is illustrated in FIG. 2. The example distribution server 130 of FIG. 2 includes an example data receiver 405 to receive data stream(s) from one or more data sources, such as the data source(s) 115. The example distribution server 130 of FIG. 2 also includes an example stream splitter 410 to split an incoming data stream from a data source into a group of partial streams to be distributed to user devices, such as the user devices 105A-E, via established data connections. In some examples, the stream splitter 410 is configured (e.g., by the connection manager 135) with respective data transmission characteristics for each of the data connections and, thus, for each of the partial data streams into which the incoming data stream is to be split. For example, each data connection and associated partial data stream can be associated with a respective bandwidth limit, data rate limit, etc., tailored to the device capabilities of the particular user device that is to receive that partial data stream. Accordingly, in some examples, the stream splitter 410 may split the incoming data stream into partial data streams having different data transmission characteristics, whereas in other examples, the stream splitter 410 may split the incoming data stream into partial data streams having similar, or the same, data transmission characteristics.

In some examples, the example distribution server 130 of FIG. 2 further includes an example transcoder 415 to transcode the data as it is being split from the incoming data stream into the partial data streams. The transcoder 415 performs transcoding to modify the characteristics of the data payload and/or control information included in the partial data streams generated by the stream splitter 410 from the incoming data stream. For example, based on the device capabilities of a particular user device associated with a particular data stream, the transcoder 415 may be used to modify the partial data stream to change the block size of the data payload, perform data interpolation on the data payload, re-encode control information included in the partial data stream, etc., to conform the partial data stream with one or more communication protocols supported by the user device. Accordingly, the transcoder 415 can support any number and/or type(s) of transcoding algorithms tailored to the expected device capabilities of user devices that are to receive the partial data streams generated by the distribution server 130.

Figure 3:
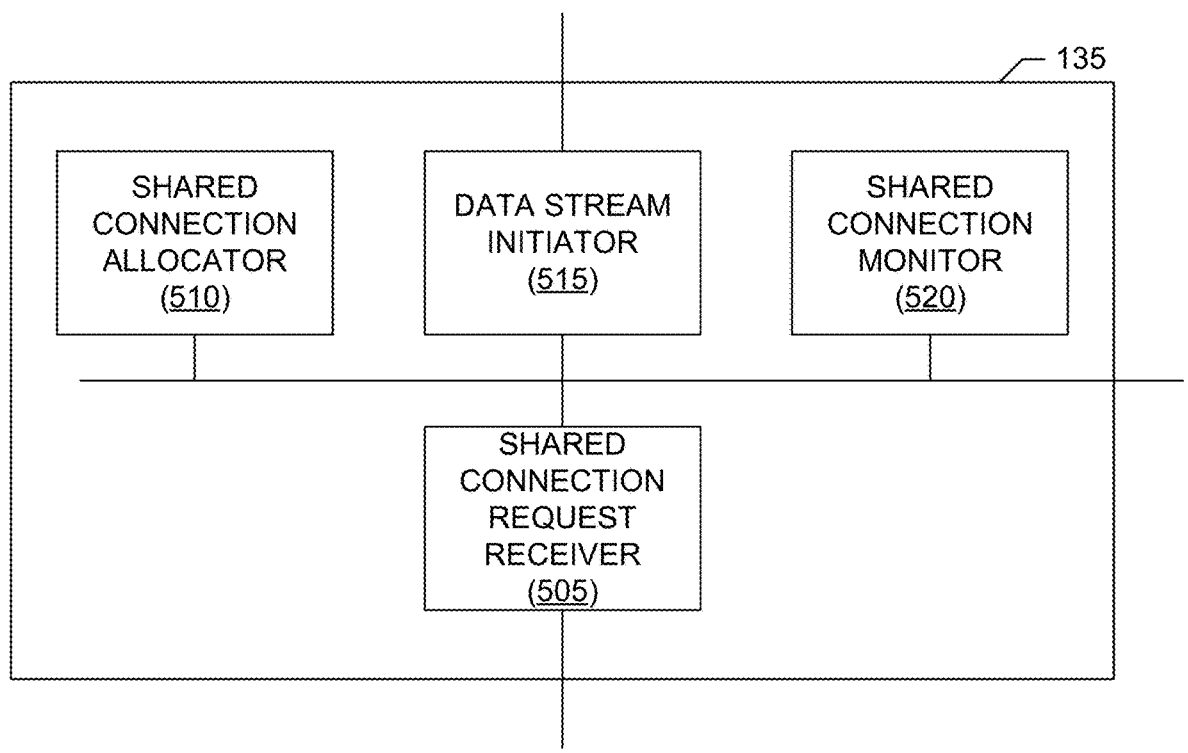
FIG. 3 is block diagram of an example connection manager that may be used to implement the example communication system of FIG. 1.

A block diagram depicting an example implementation of the connection manager 135 of FIG. 1 is illustrated in FIG. 3. The example connection manager 135 of FIG. 3 includes an example shared connection request receiver 505 to receive shared connection requests from user devices, such as the primary user device 105A. As described above, a shared connection request includes, for example, data source identification information identifying a target data source, such as a data source 115, from which the primary user device 105A is requesting that a data stream be provided. In some examples, the shared connection request can also include device identification information, as described above, to identify the secondary user devices, such as the secondary user devices 105B-E, that are to be included in a shared connection among which the data stream from the identified target source is to be distributed. (It is assumed that the shared connection request itself, such as the source address information included in a control header of the request, can be used to identify the primary user device that is the source of the request. However, in some examples, the shared connection request may also include device identification information identifying the primary user device that is the source of the request.)

The example connection manager 135 of FIG. 3 also includes an example shared connection allocator 510 to allocate data connections for the user devices to be included in a shared connection established in response to a shared connection request received by the shared connection request receiver 505. In some examples, such as in which the data connections with the user devices are initially established by the service provider network 110 of FIG. 1 using the device identification information included in the shared connection request, the shared connection allocator 510 further allocates respective data transmission characteristics for these data connections based on device capability information obtained from the system that initially established the data connections. For example, the shared connection allocator 510 can use the device capability information for the different user devices included in a shared connection request to allocate respective bandwidth limits, data rate limits, transcoding parameters, etc., to the data connections established with the user devices.

The example connection manager 135 of FIG. 3 further includes an example data stream initiator 515 to initiate a data stream from the target data source identified in the shared connection request received by the shared connection request receiver 505. For example, the data stream initiator 515 can initiate data streaming or another type of data download from the target data source, and indicate that the destination of the stream is a network address that is associated with the distribution system 120 and is further associated with the particular shared connection that was established in response to the received shared connection request. In such examples, the distribution system 120 knows that a data stream received at an address associated with a particular shared connection is to be distributed into partial data streams by the distribution server 130 as disclosed herein.

In some examples, the example connection manager 135 of FIG. 3 includes an example shared connection monitor 520 to monitor the status of shared connections being used to distribute the communication of data streams among multiple user devices. For example, to monitor a shared connection associated with the user devices 105A-E, the shared connection monitor 520 can monitor for status update messages received from the primary user device 105A to indicate that the composition of the group of user devices 105A-E associated with the shared connection has changed (e.g., because user device(s) have entered or left the group). Additionally or alternatively, in some examples the shared connection monitor 520 can monitor that status of partial data streams being communicated to the group of user devices 105A-E associated with the shared connection to determine whether one or more of the streams has stalled (e.g., because acknowledgment(s) have not been received from one or more of the user devices 105A-E). In the illustrated example, in response to detecting a change in status of a shared connection, the shared connection monitor 520 notifies the shared connection allocator 510 to cause the shared connections with the user devices 105A-E to be updated accordingly (e.g., to add/delete user connections, to adjust the allocation of data to the different partial data streams, etc.).

Figure 4:
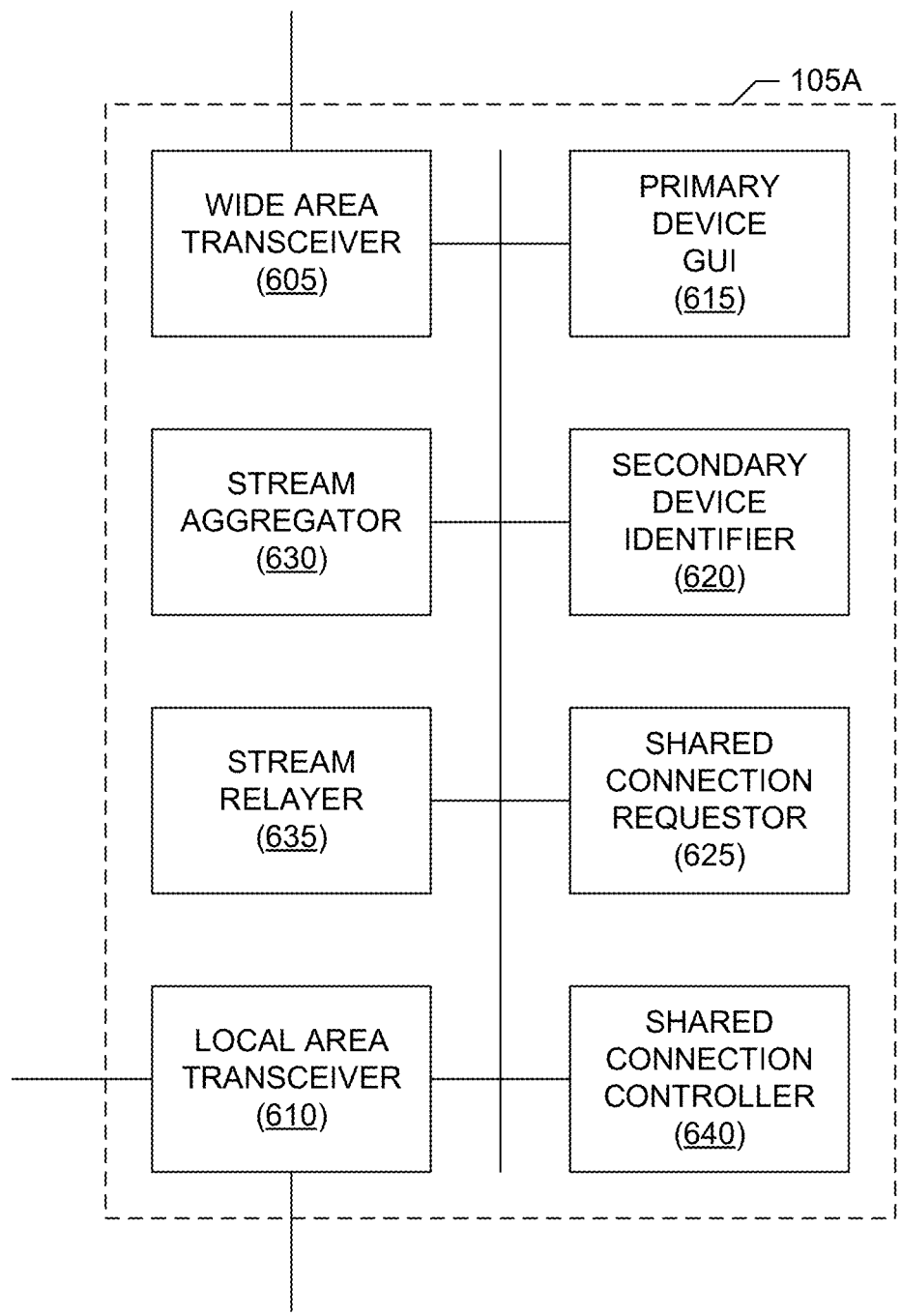
FIG. 4 is block diagram of an example primary device that may be used in the example communication system of FIG. 1.

A block diagram depicting an example implementation of the primary user device 105A of FIG. 1 is illustrated in FIG. 4. The example primary user device 105A of FIG. 4 includes an example wide area transceiver 605 that implements any number and/or type(s) of wireline and/or wireless communication interfaces, protocols, etc., to communicate with one or more of service provider networks, such as the service provider network(s) 110. The primary user device 105A of FIG. 4 also includes an example local area transceiver 610 that implements any number and/or type(s) of wireline and/or wireless communication interfaces, protocols, etc., to implement one or more local data connections with one or more secondary devices, such as the secondary devices 105B-E. For example, the local area transceiver 610 can implement local data connections with other secondary devices via an ad-hoc network, tethering and/or any external data connection (such as a Wi-Fi connection, a Bluetooth connection, a universal serial bus (USB) connection, a docking connection, etc.).

The example primary user device 105A of FIG. 4 further includes an example primary device graphical user interface (GUI) 615 to provide an interface by which a user may invoke, monitor, modify, etc., a shared connection for distributing a data stream among multiple user devices, as disclosed herein. For example, the primary device GUI 615 can be implemented by an Internet browser, a wireless application protocol (WAP) browser, a JAVA application, etc. In some examples, the primary device GUI 615 provides an interface to enable a user to select a target data source, such as one of the target data source(s) 115, that is to provide the data stream whose communication is to be distributed among the multiple user devices via the shared connection. In some examples, the primary device GUI 615 also provides an interface to enable a user to select and/or otherwise identify the secondary devices, such as the secondary devices 105B-E, to be included with the primary user device 105A in the shared connection. For example, the primary device GUI 615 can cause the primary user device 105A to initiate any type of automated discovery process to detect the secondary device(s) 105B-E that are within communication range of the primary user device 105A. Additionally or alternatively, the primary device GUI 615 may implement an interface to enable the user to manually enter secondary device identification information, such as phone number(s), URI(s), etc., for the secondary device(s) 105B-E to be included with the primary device 105A in the shared connection. Furthermore, in some examples, the primary device GUI 615 provides an interface to enable the user to initiate establishment of the shared connection via which communication of a data stream is to be distributed among the multiple user devices.

The example primary user device 105A of FIG. 4 further includes an example secondary device identifier 620 to identify the secondary devices, such as the secondary devices 105B-E, to be included with the primary user device 105A in the shared connection. For example, the primary device GUI 615 can initiate any type of automated discovery process to detect (e.g., via communication links established by the local area transceiver 610) the secondary device(s) 105B-E that are within communication range of the primary user device 105A. Additionally or alternatively, the primary device GUI 615 may receive secondary device identification information, such as phone number(s), URI(s), etc., entered manually via the primary device GUI 615 for the secondary device(s) 105B-E to be included with the primary device 105A in the shared connection.

The example primary user device 105A of FIG. 4 also includes an example shared connection requestor 625 to generate and send a shared connection request, as described above, to a distribution system, such as the distribution system 120, to request establishment of a shared connection via which communication of a data stream from an identified target data source is to be distributed. For example, the shared connection requestor 625 can generate a shared connection request message including target source identification information (e.g., specified via the primary device GUI 615) specifying the target data source 115 from which the data stream to be distributed is to be provided. Additionally or alternatively, in some examples, the shared connection request message generated by the shared connection requestor 625 can include secondary device identification information to identify the secondary devices 105B-E to be included in the requested shared connection.

The example primary user device 105A of FIG. 4 further includes an example stream aggregator 630 to reorder and/or otherwise aggregate partial data streams received from other user devices 105B-E to form the complete data stream being provided by the target data source 115 identified in the shared connection request generated and sent to the distribution system 120 via the shared connection requestor 625. For example, the stream aggregator 630 of the illustrated example can receive, via the local communication links established using the local area transceiver 610, one or more of the partial data streams from the secondary user devices 105B-E that each form a part of the complete data stream being provided by the target data source 115. In some examples, the stream aggregator 630 receives the partial data streams from all of the secondary user devices 105B-E and aggregates the partial data streams (e.g., possibly after reordering to account for different data packet arrival times at the different user devices 105A-E) to form the complete data stream being provided by the target data source 115. In some examples supporting hierarchical aggregation as described above, the stream aggregator 630 receives the partial data streams from a subset of one or more of the secondary user devices 105B-E and aggregates the partial data streams (e.g., possibly after reordering to account for different data packet arrival times at the different user devices 105A-E) to form an intermediate aggregated data stream to be provided to another user device, or any other device, that is to aggregate other intermediate aggregated data streams determined by other(s) of the devices 105A-E to form the complete data stream.

The example primary user device 105A of FIG. 4 also includes an example stream relayer 635 to relay (e.g., via the local area transceiver 610) the complete aggregated data stream, or an intermediate aggregated data stream in the case of an example hierarchical aggregation implementation, to a recipient. For example, the stream relayer 635 can communicate the complete data stream from the target data source 115, which is formed by the stream aggregator 630 through aggregating all of the partial data streams received by the primary user device 105A and the secondary user devices 105B-E, to the output device 125 for further processing, presentation, etc. As another example, the stream relayer 635 can communicate an intermediate aggregated data stream formed by the stream aggregator 630 through aggregating a subset of the partial data streams received by the primary user device 105A and the secondary user devices 105B-E to another of the user devices 105B-E for further aggregation.

In some examples, the primary user device 105A of FIG. 4 includes an example shared connection controller 640 to monitor and/or otherwise control the shared connection established in response to the shared connection request generated and sent by the shared connection requestor 625. For example, the shared connection controller 640 can detect, via data communications exchanged via the local area transceiver 610, one or more secondary user devices, such as one or more of the secondary devices 105B-E, entering or leaving an operating area, or otherwise becoming available or unavailable. Additionally or alternatively, the shared connection controller 640 can interface with the primary device GUI 615 to enable a user to manually enter changes in the composition of the secondary devices 105B-E to be included in the shared connection via which communication of the data stream provided by the target data source 115 is to be distributed. The shared connection controller 640 can then report such changes in the composition of the secondary devices 105B-E associated with the existing shared connection to the distribution system 120 to modify the shared connection accordingly.

Figure 5:
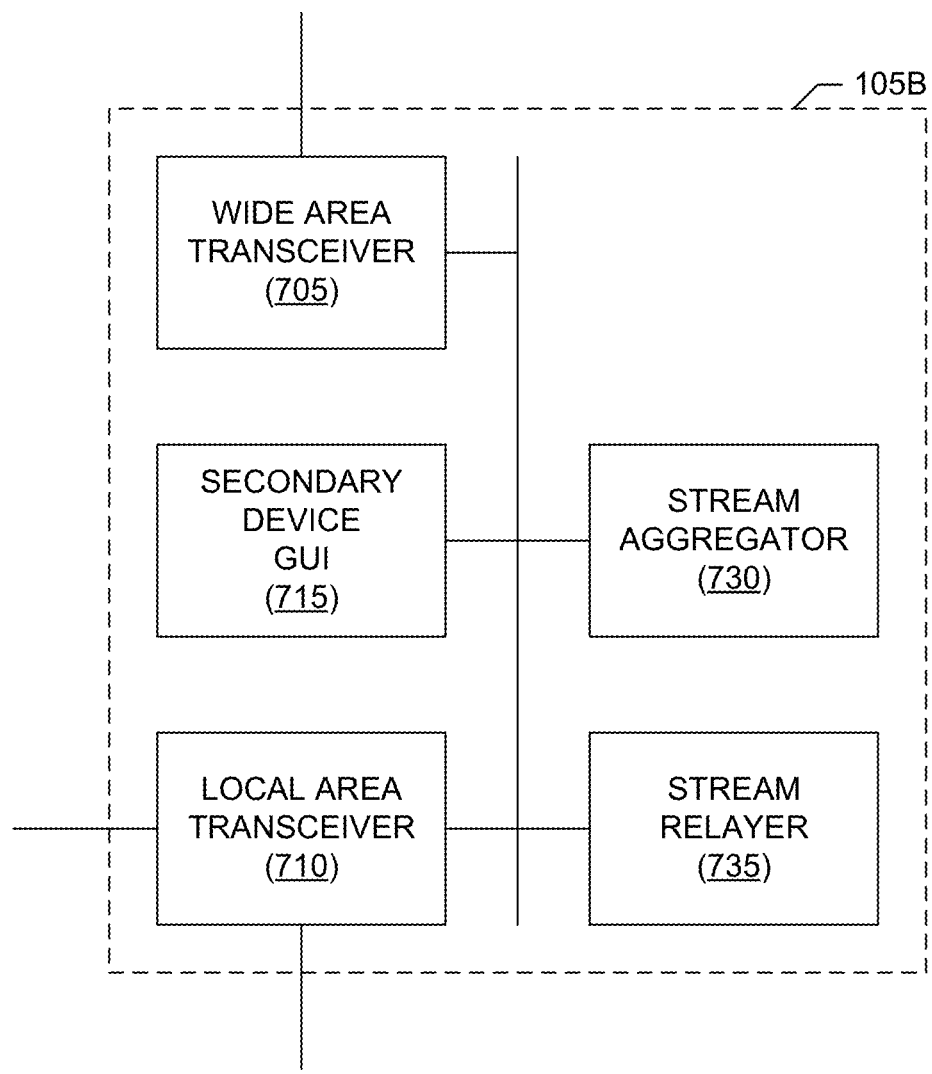
FIG. 5 is block diagram of an example secondary device that may be used in the example communication system of FIG. 1.

A block diagram depicting an example implementation of any one of the secondary user devices 105B-E of FIG. 1 is illustrated in FIG. 5. For convenience and without loss of generality, the example block diagram of FIG. 5 is described from the perspective of implementing the secondary user device 105B, but the example of FIG. 5 could additionally or alternatively be used to implement other ones of the secondary user devices 105B-E. Turning to FIG. 5, the example secondary user device 105B of the illustrated example includes an example wide area transceiver 705 and an example local area transceiver 710, which may be similar to the wide area transceiver 605 and the example local area transceiver 610 included in the example primary user device 105A of FIG. 4.

In the illustrated example of FIG. 5, the example secondary user device 105B also includes an example secondary device GUI 715 to provide an interface by which a user may cause the secondary user device 105B to join a shared connection being established by a primary user device, such as the primary user device 105A. For example, the secondary device GUI 715 can be implemented by an Internet browser, a WAP browser, a JAVA application, etc. In some examples, the secondary device GUI 715 provides an interface to enable a user to cause the secondary user device 105B to announce (e.g., via data communications using the local area transceiver 710) its availability for joining a group of user devices, such as the group of devices 105A-E, to be included in a shared connection request. In some examples, the secondary device GUI 715 additionally or alternatively provides an interface to enable a user to update the availability of the secondary user device 105B for inclusion in an existing shared connection. In such examples, in response to receiving a status update via the secondary device GUI 715, the secondary user device 105B can send the status update via the local area transceiver 710 to the primary user device 105A for reporting via its shared connection controller 640.

The example secondary user device 105B of FIG. 5 also includes an example stream aggregator 730 and an example stream relayer 735, which may be similar to the stream aggregator 630 and an example stream relayer 635 included in the primary user device 105A of FIG. 4. For example, the stream relayer 735 may be used to relay or otherwise communicate a partial data stream received via the wide area transceiver 705 of the secondary user device 105B, and associated with a target data stream being communicated by a shared connection, to the primary user device 105A or another of the secondary user devices 105C-E for aggregation to form the complete data stream. Additionally or alternatively, the stream aggregator 730 may be used to aggregate the partial data stream received via the wide area transceiver 705 of the secondary user device 105B with partial data streams from one or more of the user devices 105A, C-E to, for example, implement hierarchical aggregation, as described above.

While example manners of implementing the example communication system 100, the example user devices 105A-E, the example service provider network(s) 110, the example data source(s) 115, the example distribution system 120, the example output device 125, the example distribution server 130, the example connection manager 135, the example data receiver 405, the example stream splitter 410, the example transcoder 415, the example shared connection request receiver 505, the example shared connection allocator 510, the example data stream initiator 515, the example shared connection monitor 520, the example wide area transceiver 605, the example local area transceiver 610, the example primary device GUI 615, the example secondary device identifier 620, the example shared connection requestor 625, the example stream aggregator 630, the example stream relayer 635, the example shared connection controller 640, the example wide area transceiver 705, the example local are transceiver 710, the example secondary device GUI 715, the example stream aggregator 730 and the example stream relayer 735 have been illustrated in FIGS. 1-5, one or more of the elements, processes and/or devices illustrated in FIGS. 1-5 may be combined, divided, re-arranged, omitted, eliminated and/or implemented in any other way. Further, the example user devices 105A-E, the example service provider network(s) 110, the example data source(s) 115, the example distribution system 120, the example output device 125, the example distribution server 130, the example connection manager 135, the example data receiver 405, the example stream splitter 410, the example transcoder 415, the example shared connection request receiver 505, the example shared connection allocator 510, the example data stream initiator 515, the example shared connection monitor 520, the example wide area transceiver 605, the example local area transceiver 610, the example primary device GUI 615, the example secondary device identifier 620, the example shared connection requestor 625, the example stream aggregator 630, the example stream relayer 635, the example shared connection controller 640, the example wide area transceiver 705, the example local are transceiver 710, the example secondary device GUI 715, the example stream aggregator 730, the example stream relayer 735 and/or, more generally, the example communication system 100 of FIGS. 1-5 may be implemented by hardware, software, firmware and/or any combination of hardware, software and/or firmware. Thus, for example, any of the example user devices 105A-E, the example service provider network(s) 110, the example data source(s) 115, the example distribution system 120, the example output device 125, the example distribution server 130, the example connection manager 135, the example data receiver 405, the example stream splitter 410, the example transcoder 415, the example shared connection request receiver 505, the example shared connection allocator 510, the example data stream initiator 515, the example shared connection monitor 520, the example wide area transceiver 605, the example local area transceiver 610, the example primary device GUI 615, the example secondary device identifier 620, the example shared connection requestor 625, the example stream aggregator 630, the example stream relayer 635, the example shared connection controller 640, the example wide area transceiver 705, the example local are transceiver 710, the example secondary device GUI 715, the example stream aggregator 730, the example stream relayer 735 and/or, more generally, the example communication system 100 could be implemented by one or more circuit(s), programmable processor(s), application specific integrated circuit(s) (ASIC(s)), programmable logic device(s) (PLD(s)) and/or field programmable logic device(s) (FPLD(s)), etc. When any of the apparatus or system claims of this patent are read to cover a purely software and/or firmware implementation, at least one of the example communication system 100, the example user devices 105A-E, the example service provider network(s) 110, the example data source(s) 115, the example distribution system 120, the example output device 125, the example distribution server 130, the example connection manager 135, the example data receiver 405, the example stream splitter 410, the example transcoder 415, the example shared connection request receiver 505, the example shared connection allocator 510, the example data stream initiator 515, the example shared connection monitor 520, the example wide area transceiver 605, the example local area transceiver 610, the example primary device GUI 615, the example secondary device identifier 620, the example shared connection requestor 625, the example stream aggregator 630, the example stream relayer 635, the example shared connection controller 640, the example wide area transceiver 705, the example local are transceiver 710, the example secondary device GUI 715, the example stream aggregator 730 and/or the example stream relayer 735 are hereby expressly defined to include a tangible computer readable medium such as a memory, digital versatile disk (DVD), compact disk (CD), Blu-ray Disc™, etc., storing such software and/or firmware. Further still, the examples of FIGS. 1-5 may include one or more elements, processes and/or devices in addition to, or instead of, those illustrated in FIGS. 1-5, and/or may include more than one of any or all of the illustrated elements, processes and devices.

Flowcharts representative of example machine readable instructions for implementing the example communication system 100, the example user devices 105A-E, the example service provider network(s) 110, the example data source(s) 115, the example distribution system 120, the example output device 125, the example distribution server 130, the example connection manager 135, the example data receiver 405, the example stream splitter 410, the example transcoder 415, the example shared connection request receiver 505, the example shared connection allocator 510, the example data stream initiator 515, the example shared connection monitor 520, the example wide area transceiver 605, the example local area transceiver 610, the example primary device GUI 615, the example secondary device identifier 620, the example shared connection requestor 625, the example stream aggregator 630, the example stream relayer 635, the example shared connection controller 640, the example wide area transceiver 705, the example local are transceiver 710, the example secondary device GUI 715, the example stream aggregator 730 and/or the example stream relayer 735 are shown in FIGS. 6-9. In these examples, the machine readable instructions represented by each flowchart may comprise one or more programs for execution by a processor, such as the processor 1812 shown in the example processing system 1800 discussed below in connection with FIG. 10. The one or more programs, or portion(s) thereof, may be embodied in software stored on a tangible computer readable medium such as a CD-ROM, a floppy disk, a hard drive, a digital versatile disk (DVD), a Blu-ray Disc™, or a memory associated with the processor 1812, but the entire program or programs and/or portions thereof could alternatively be executed by a device other than the processor 1812 (e.g., such as a controller and/or any other suitable device) and/or embodied in firmware or dedicated hardware (e.g., implemented by an ASIC, a PLD, an FPLD, discrete logic, etc.). Also, one or more of the machine readable instructions represented by the flowchart of FIGS. 6-9 may be implemented manually. Further, although the example machine readable instructions are described with reference to the flowcharts illustrated in FIGS. 6-9, many other methods of implementing the example communication system 100, the example user devices 105A-E, the example service provider network(s) 110, the example data source(s) 115, the example distribution system 120, the example output device 125, the example distribution server 130, the example connection manager 135, the example data receiver 405, the example stream splitter 410, the example transcoder 415, the example shared connection request receiver 505, the example shared connection allocator 510, the example data stream initiator 515, the example shared connection monitor 520, the example wide area transceiver 605, the example local area transceiver 610, the example primary device GUI 615, the example secondary device identifier 620, the example shared connection requestor 625, the example stream aggregator 630, the example stream relayer 635, the example shared connection controller 640, the example wide area transceiver 705, the example local are transceiver 710, the example secondary device GUI 715, the example stream aggregator 730 and/or the example stream relayer 735 may alternatively be used. For example, with reference to the flowcharts illustrated in FIGS. 6-9, the order of execution of the blocks may be changed, and/or some of the blocks described may be changed, eliminated, combined and/or subdivided into multiple blocks.

As mentioned above, the example processes of FIGS. 6-9 may be implemented using coded instructions (e.g., computer readable instructions) stored on a tangible computer readable medium such as a hard disk drive, a flash memory, a read-only memory (ROM), a CD, a DVD, a cache, a random-access memory (RAM) and/or any other storage media in which information is stored for any duration (e.g., for extended time periods, permanently, brief instances, for temporarily buffering, and/or for caching of the information). As used herein, the term tangible computer readable medium is expressly defined to include any type of computer readable storage and to exclude propagating signals. Additionally or alternatively, the example processes of FIGS. 6-9 may be implemented using coded instructions (e.g., computer readable instructions) stored on a non-transitory computer readable medium, such as a flash memory, a ROM, a CD, a DVD, a cache, a random-access memory (RAM) and/or any other storage media in which information is stored for any duration (e.g., for extended time periods, permanently, brief instances, for temporarily buffering, and/or for caching of the information). As used herein, the term non-transitory computer readable medium is expressly defined to include any type of computer readable medium and to exclude propagating signals. Also, as used herein, the terms "computer readable" and "machine readable" are considered equivalent unless indicated otherwise. Furthermore, as used herein, when the phrase "at least" is used as the transition term in a preamble of a claim, it is open-ended in the same manner as the term "comprising" is open ended. Thus, a claim using "at least" as the transition term in its preamble may include elements in addition to those expressly recited in the claim.

Figure 6:
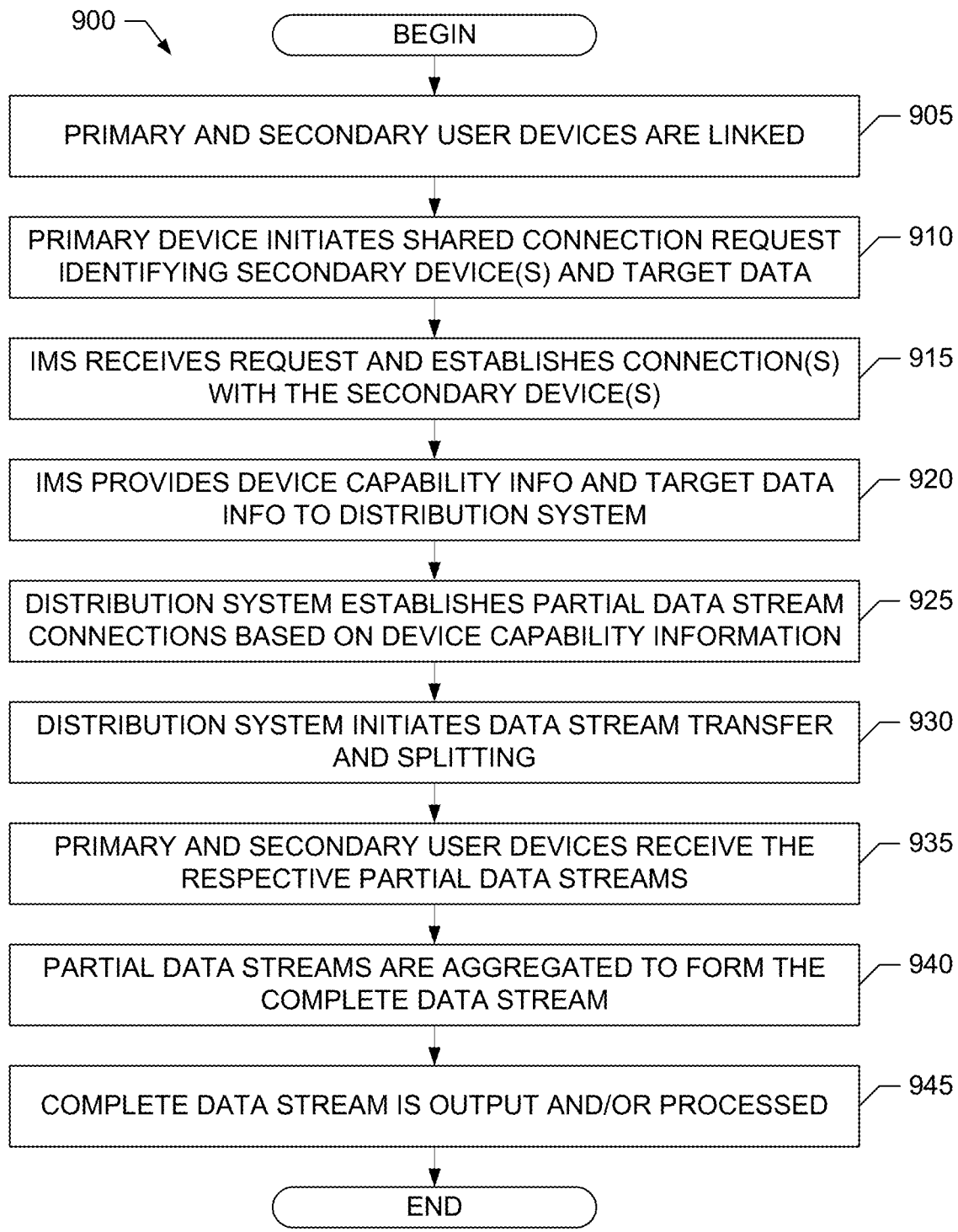
FIG. 6 is a flowchart representative of example machine readable instructions that may be executed to implement the example communication system of FIG. 1.

Example machine readable instructions 900 that may be executed to implement the example communication system 100 of FIG. 1 are represented by the flowchart shown in FIG. 6. With reference to the preceding figures and associated descriptions, the machine readable instructions 900 of FIG. 6 begin execution at block 905 at which the user devices 105A-E are linked via, for example, an ad-hoc network, tethering connections and/or other communication links, as described above. At block 910, the primary user device 105A initiates a shared connection request to the distribution system 120, as described above. In the illustrated example of FIG. 6, the shared connection request includes information identifying the secondary user devices 105B-E to be included in the shared connection being requested. The shared connection request initiated at block 910 also includes information identifying the target data source (e.g., the target data source 115) that is to provide the data stream whose communication is to be distributed among the user devices 105A-E identified by the shared connection request.

At block 915, an IMS network included in the service provider network 110 receives the shared connection request from the primary user device 105A and uses the secondary device identification information included in the shared connection request to establish data connections (e.g., secondary data connections) with the identified secondary devices 105B-E, as described above. (In the illustrated example, it is assumed that a data connection (e.g., a primary data connection) is already established by the IMS network with the primary device 105A because the request is received by the IMS network as a data communication from the primary device 105A.) At block 920, the IMS network of the service provider network 110 provides device capability information for the user devices 105A-E (e.g., which was learned during initial establishment of the data connections with the user devices 105A-E) to the distribution system 120, as described above. In the illustrated example, at block 920, the IMS network of the service provider network 110 also provides the target data identification information to the distribution system 120.

At block 925, the distribution system 120 associates data transmission characteristics with the data connections to complete establishment of the data connections with the user devices 105A-E. As described above, the data transmission characteristics determined for the respective data connections are based on the device capability information obtained for the respective user devices 105A-E, thereby causing each data connections to be tailored to its respective user device 105A-E. As described above, the data connections established with the user devices 105A-E are used to convey the partial data streams associated with a complete data stream to the user devices 105A-E.

At block 930, the distribution system 120 initiates the transfer of the data stream from the target data source 115 identified in the shared connection request, and splits the complete data stream into partial data streams to be communicated to the user devices 105A-E via the established data connections, as described above. At block 935, the user devices 105A-E receive their respective partial data streams via their respective data connections with the distribution system 120. At block 940, the partial data streams are aggregated, as described above, to form the complete data stream being provided by the target data source 115. At block 945, the complete data stream formed by aggregating the partial data streams is output to, for example, the output device 125 and/or processed by one of the user devices, such as the primary user device 105A.

Figure 7:
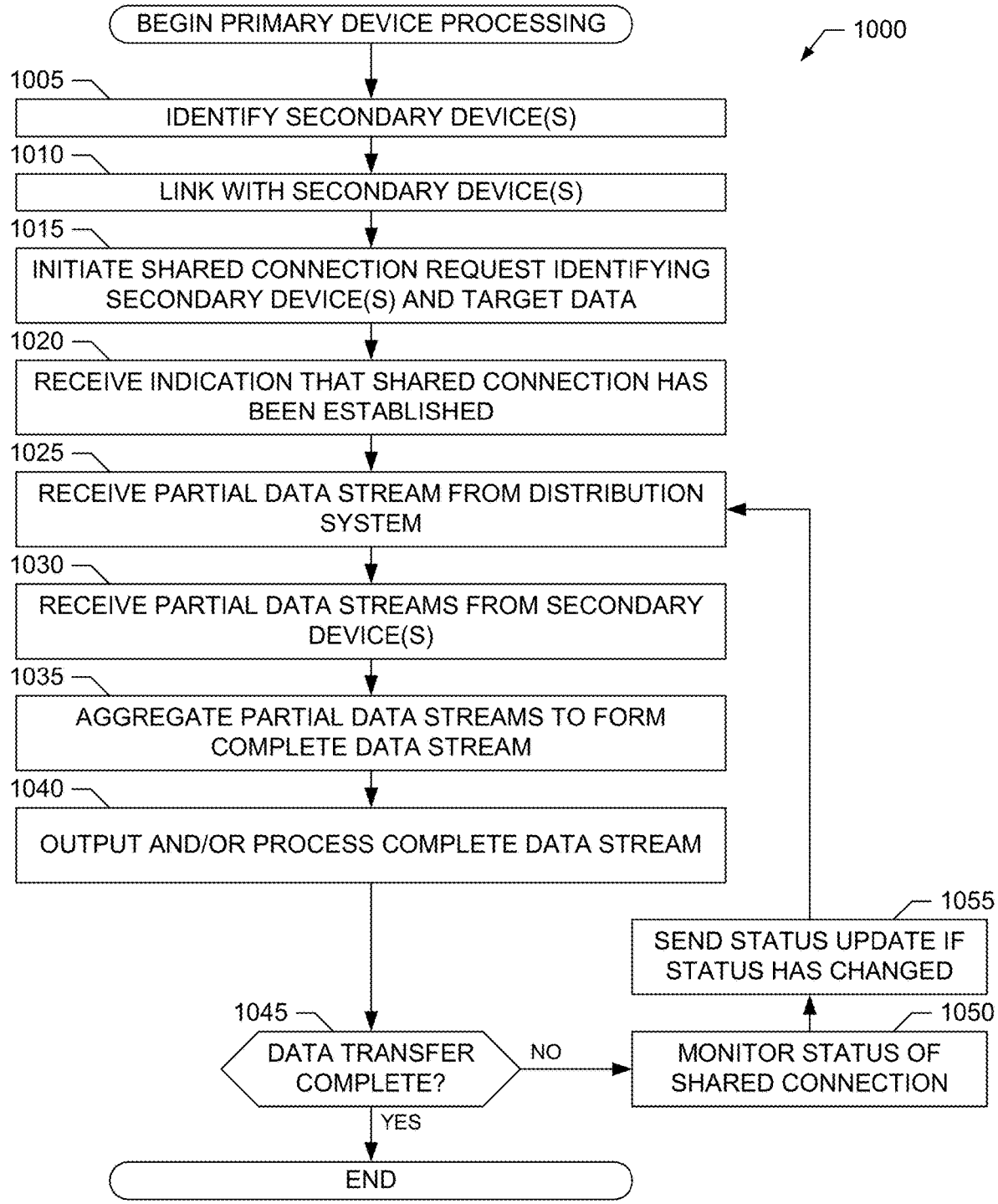
FIG. 7 is a flowchart representative of example machine readable instructions that may be executed to implement the example primary device of FIG. 4.

Example machine readable instructions 1000 that may be executed to implement the example primary user device 105A of FIGS. 1 and/or 4 are represented by the flowchart shown in FIG. 7. For convenience, and without loss of generality, execution of the machine readable instructions 1000 is described in the context of the primary user device 105A operating in the example communication system 100 of FIG. 1. With reference to the preceding figures and associated descriptions, the machine readable instructions 1000 of FIG. 7 begin execution at block 1005 at which the secondary device identifier 620 of the primary user device 105A identifies the secondary user devices 105B-E to be included in a shared connection for distributing communication of a data stream from a target data source 115. For example, at block 1005, the primary user device 105A can use an auto-discovery procedure, information entered via the primary device GUI 615, etc., to identify the secondary user devices 105B-E, as described above. At block 1010, the primary user device 105A uses its local area transceiver 610 to establish local communication links, such as tethering links, an ad-hoc network, etc., with the secondary user devices 105B-E identified at block 1005.

At block 1015, the shared connection requestor 625 of the primary user device 105A generates and sends a shared connection request to the distribution system 120 to request a shared connection for distributing communication of a data stream being provided by an identified target data source 115. In the illustrated example of FIG. 7, the shared connection request includes information identifying the secondary user devices 105B-E to be included in the shared connection being requested. The shared connection request initiated at block 1015 also includes information identifying the target data source (e.g., the target data source 115) that is to provide the data stream whose communication is to be distributed among the user devices 105A-E identified by the shared connection request.

At block 1020, the primary user device 105A receives an indication from the distribution system 120 (e.g., via a message received from the service provider network 110 by the wide area transceiver 605 of the primary user device 105A) indicating that the requested shared connection has been established. For example, the distribution system 120 may send such an indication to the primary user device 105A after the data connections have been established (e.g., based on the device identification information included in the request) with all of the user devices 105A-E that are to be included in the shared connection. After the shared connection is established, at block 1025, the primary user device 105A begins receiving, via its wide area transceiver 605, a partial data stream corresponding to a portion of the complete data stream being provided by the target data source 115 identified in the shared connection request.

At block 1030, the stream aggregator 630 of the primary user device 105A receives, via the local communication links established at block 1010, the partial data streams received by the other (e.g., secondary) user devices 105B-E included in the shared connection. At block 1035, the stream aggregator 630 aggregates, as described above, the partial data streams (e.g., possibly after reordering to account for different data packet arrival times at the different user devices 105A-E) to form the complete data stream being provided by the target data source 115. At block 1040, the primary user device 105A performs any appropriate post-processing on the aggregated, complete data stream, and/or the stream relayer 635 of the primary user device 105A outputs the complete data stream for use by another device, such as the output device 125.

If the transfer of the data stream is not complete and, thus, the data stream is still being communicated (block 1045), then at block 1050, the shared connection controller 640 of the primary user device 105A monitors the status of the shared connection, as described above. For example, the shared connection controller 640 can detect changes in the composition (e.g., membership) of the group of user devices 105A-E (e.g., such as when device(s) enter and/or leave an operating area) automatically (e.g., via communications exchanged using the local area transceiver 610) and/or manually (e.g., via information entered via the primary device GUI 615). At block 1055, the shared connection controller 640 sends (e.g., via its wide area transceiver 605) any status updates to the distribution system 120. Processing then returns to block 1025 and blocks subsequent thereto at which the primary user device 105A continues to receive its partial data stream corresponding to a portion of the complete data stream being provided by the target data source 115 (although the data transmission characteristic(s) of the partial data stream may be modified by the distribution system 120 in response to status update(s) received via the processing at block 1055).

Figure 8:
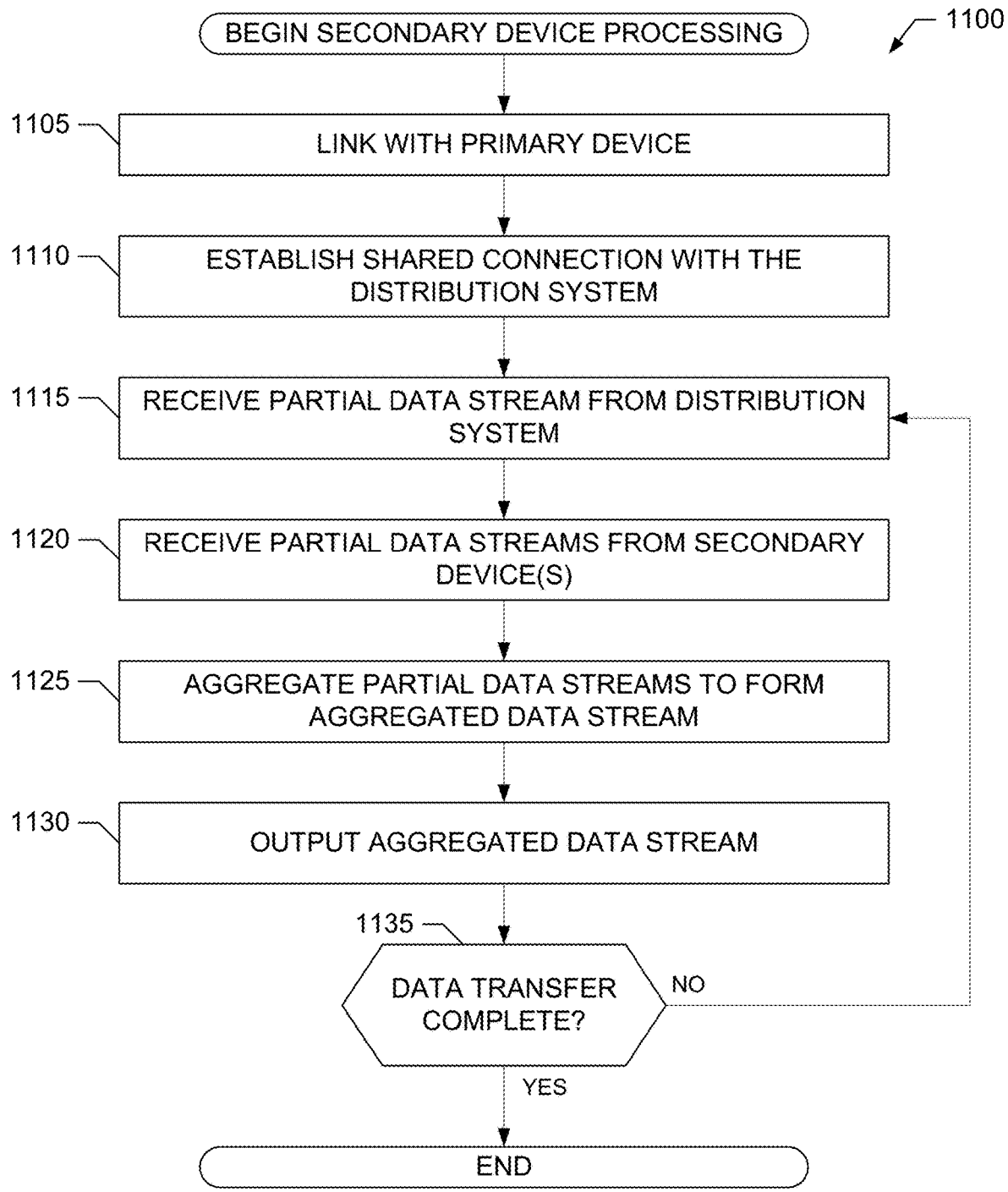
FIG. 8 is a flowchart representative of example machine readable instructions that may be executed to implement the example secondary device of FIG. 5.

Example machine readable instructions 1100 that may be executed to implement one or more of the example secondary user devices 105B-E of FIGS. 1 and/or 5 are represented by the flowchart shown in FIG. 8. For convenience, and without loss of generality, execution of the machine readable instructions 1100 is described in the context of the secondary user device 105B operating in the example communication system 100 of FIG. 1. With reference to the preceding figures and associated descriptions, the machine readable instructions 1100 of FIG. 8 begin execution at block 1105 at which the secondary user device 105B uses its local area transceiver 710 to establish a local communication link with a primary device, such as the primary user device 105A, as described above. At block 1110, the secondary user device 105B (e.g., via its wide area transceiver 705) establishes a data connection with the distribution system 120, as described above. For example, at block 1110, the secondary user device 105B may receive communications from the service provider network 115 (e.g., based on identification information for the secondary user device 105B included in a preceding shared connection request) requesting establishment of a data connection for use in distributing communication of a data stream. In some examples, the secondary user device 105B responds to such a request automatically (e.g., based on stored information specifying whether such requests are to be accepted or rejected) and/or manually based on information entered via the secondary device GUI 715. In some examples, at block 1110, the secondary user device 105B also signals its device capability information during establishment of the shared connection.

At block 1115, the secondary user device 105B begins receiving, via its wide area transceiver 705, a partial data stream corresponding to a portion of the complete data stream being provided by a target data source 115 (e.g., which is the subject of the shared connection in which the secondary user device 105B has joined). In some examples, such as examples supporting hierarchical aggregation, at block 1120, the stream aggregator 730 of the secondary user device 105B receives, via local communication links established using its local area transceiver 710, the partial data stream(s) received by one or more of the other user devices 105A, C-E included in the shared connection. At block 1125, the stream aggregator 730 aggregates, as described above, the partial data streams (e.g., possibly after reordering to account for different data packet arrival times at the different user devices 105A-E) to form, for example, an intermediate aggregated data stream corresponding to a portion of the complete data stream being provided by the target data source 115. At block 1130, the stream relayer 735 of the secondary user device 105B outputs the intermediate aggregated data stream for use by another device, such as the primary user device 105A, to complete the hierarchical aggregation process. If the transfer of the data stream is not complete and, thus, the data stream is still being communicated (block 1135), then processing then returns to block 1115 and blocks subsequent thereto at which the secondary user device 105B continues to receive its partial data stream corresponding to its portion of the complete data stream being provided by the target data source 115 (although the data transmission characteristic(s) of the partial data stream may be modified by the distribution system 120 in response to changes in the status of the shared connection, as described above).

Figure 9:
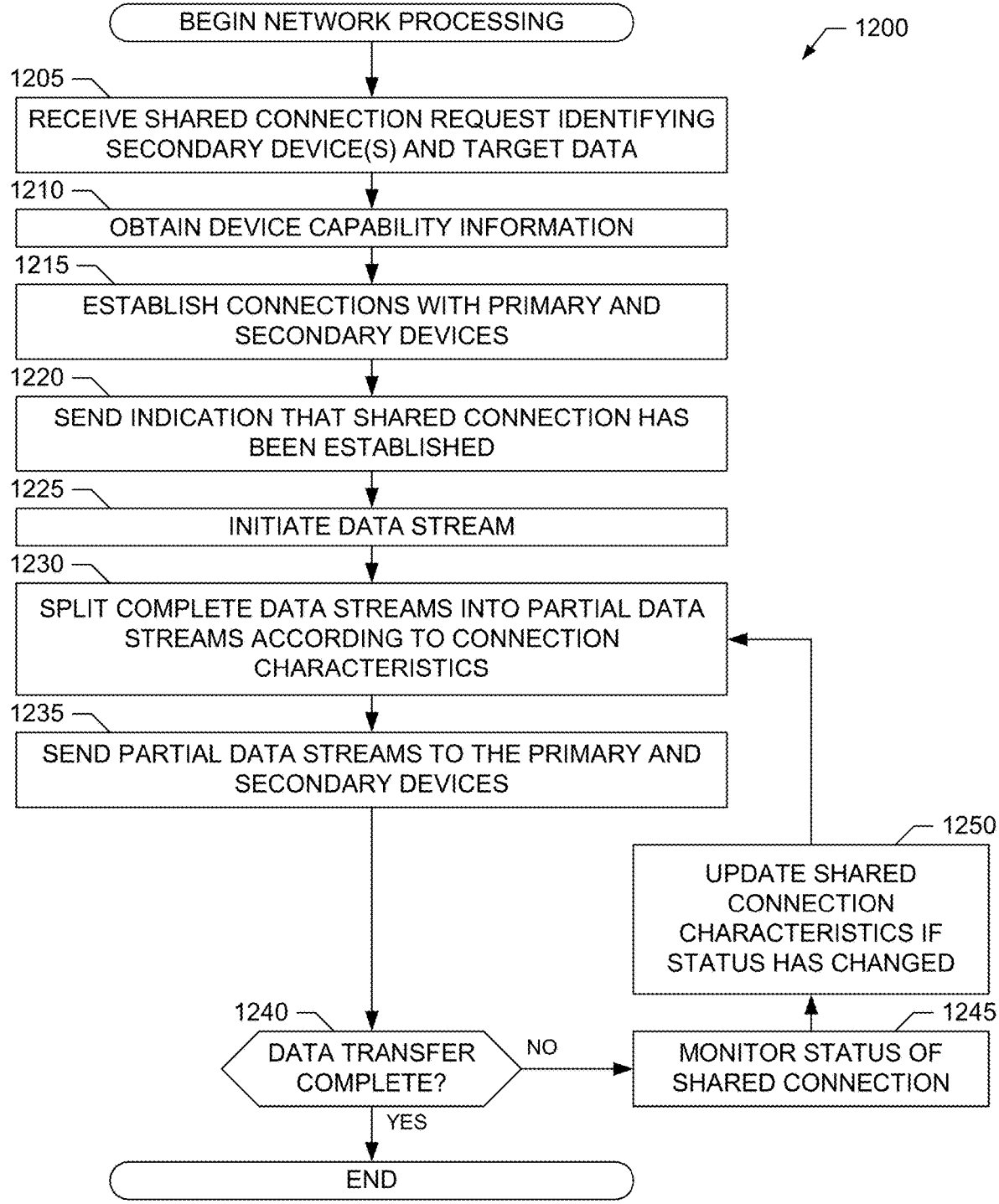
FIG. 9 is a flowchart representative of example machine readable instructions that may be executed to implement the example distribution server of FIG. 2 and/or the example connection manager of FIG. 3.

Example machine readable instructions 1200 that may be executed to implement the example distribution system 120 and, more particularly, the example distribution server 130 and/or the example connection manager 135 of FIGS. 1-3 are represented by the flowchart shown in FIG. 9. For convenience, and without loss of generality, execution of the machine readable instructions 1200 is described in the context of the distribution server 130 and the connection manager 135 operating in the example communication system 100 of FIG. 1. With reference to the preceding figures and associated descriptions, the machine readable instructions 1200 of FIG. 9 begin execution at block 1205 at which the shared connection request receiver 505 of the connection manager 135 receives a shared connection request from the primary user device 105A, as described above. In the illustrated example, the shared connection request includes device identification information identifying the secondary devices 105B-E to be included in the shared connection. In some examples, the shared connection request may include device identification information identifying the primary user device 105A, and/or the primary user device 105A may be already identified by the time its shared connection request is received by the shared connection request receiver 505. In the illustrated example, the shared connection request received at block 1205 also includes data source identification information identifying a target data source 115 that is to provide a data stream whose communication is to be distributed using the requested shared connection.

In the illustrated example of FIG. 9, the distribution system 120 is implemented in the service provider network 110 servicing the user devices 105A-E to be included in the shared connection. Accordingly, at block 1210, the shared connection allocator 510 of the connection manager 135 obtains device capability information for the user devices 105A-E from the service provider network 110, as described above. At block 1215, the shared connection allocator 510 establishes respective data connections with the user devices 105A-E by associated respective data transmission capabilities with the initial data connection established with the user devices 105A-E by the service provider network 110, as described above. For example, the data transmission capabilities to be associated with each data connection can be determined by the shared connection allocator 510 using the device capability information obtained for the particular user device associated with the data connection, as further described above.

At block 1220, the connection manager 135 sends an indication to the primary user device 105A that the shared connection has been established in response to the request received at block 1205. At block 1225, the data stream initiator 515 of the connection manager 135 initiates transfer of a data stream from the target data source 115 using the source identification information included in the request received at block 1205. At block 1230, the data receiver 405 of the distribution server 130 receives the data stream from the target data source 115, and the stream splitter 410 of the distribution server 130 splits the incoming data stream into partial data streams according to the data transmission characteristics associated with the respective data connections established with the user devices 105A-E, as described above. In some examples, at block 1230, the transcoder 415 of the distribution server 130 may be invoked to perform transcoding of the partial data streams to conform them to the capabilities of the user devices 105A-E. At block 1235, the stream splitter 410 sends the partial data streams to the user devices 105A-E using the established data connections, as described above.

If the transfer of the data stream is not complete and, thus, the data stream is still being received and split by the distribution server 130 (block 1240), then at block 1245, the shared connection monitor 520 of the connection manager 135 monitors the status of the shared connection, as described above. At block 1250, the shared connection allocator 510 updates the shared connection characteristics, as appropriate, in response to any detected changes in the status of the shared connection. For example, the shared connection allocator 510 may cause removal of the data connection(s) for any user device(s) 105A-E that are no longer available, establishment of new data connection(s) for new user device(s) that become available, modification of data transmission characteristics associated with one or more of the established data connections based on detection of changes to the device capability, link status, etc., and/or any other appropriate change to the shared connection. Processing then returns to block 1230 and blocks subsequent thereto at which the distribution server 120 continues to receive the incoming data stream and to split it into its component partial data streams for sending to the user devices 105A-E (although the data transmission characteristic(s) of the partial data stream may be modified in response to status update(s) received via the processing at block 1250).

Figure 10:
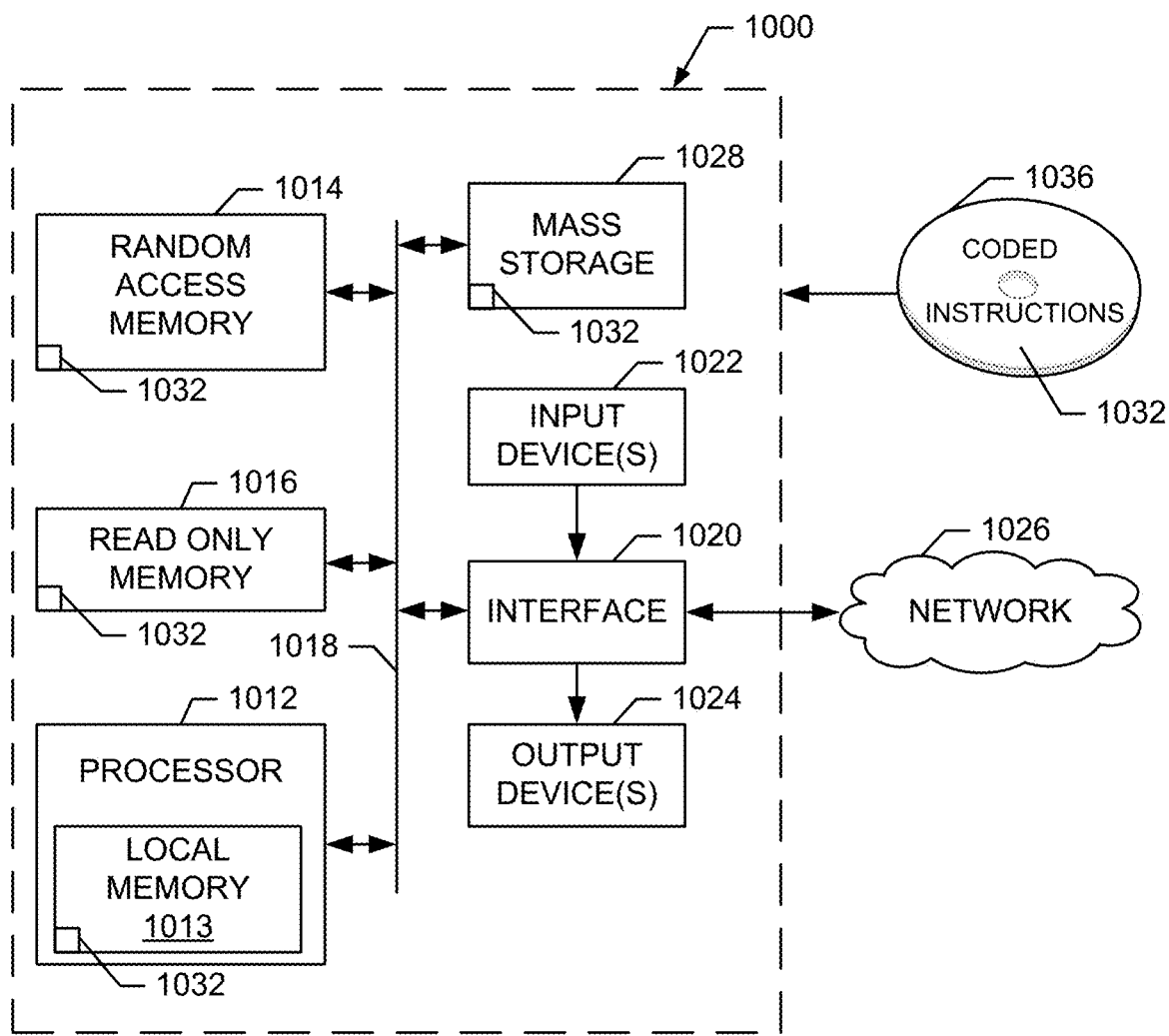
FIG. 10 is a block diagram of an example processing system that may execute the example machine readable instructions of FIGS. 6-8 and/or 9 to implement the example communication system of FIG. 1, the example distribution server of FIG. 2, the example connection manager of FIG. 3, the example primary device of FIG. 4 and/or the example secondary device of FIG. 5.

FIG. 10 is a block diagram of an example processing system 1800 capable of executing the instructions of FIGS. 6-9 to implement the example communication system 100, the example user devices 105A-E, the example service provider network(s) 110, the example data source(s) 115, the example distribution system 120, the example output device 125, the example distribution server 130, the example connection manager 135, the example data receiver 405, the example stream splitter 410, the example transcoder 415, the example shared connection request receiver 505, the example shared connection allocator 510, the example data stream initiator 515, the example shared connection monitor 520, the example wide area transceiver 605, the example local area transceiver 610, the example primary device GUI 615, the example secondary device identifier 620, the example shared connection requestor 625, the example stream aggregator 630, the example stream relayer 635, the example shared connection controller 640, the example wide area transceiver 705, the example local are transceiver 710, the example secondary device GUI 715, the example stream aggregator 730 and/or the example stream relayer 735 of FIGS. 1-5. The processing system 1800 can be, for example, a server, a personal computer, a mobile phone (e.g., a smartphone, a cell phone, etc.), a personal digital assistant (PDA), an Internet appliance, a DVD player, a CD player, a digital video recorder, a Blu-ray player, a gaming console, a personal video recorder, a set top box, a digital camera, or any other type of computing device.

The system 1800 of the instant example includes a processor 1812. For example, the processor 1812 can be implemented by one or more microprocessors and/or controllers from any desired family or manufacturer.

The processor 1812 includes a local memory 1813 (e.g., a cache) and is in communication with a main memory including a volatile memory 1814 and a non-volatile memory 1816 via a bus 1818. The volatile memory 1814 may be implemented by Static Random Access Memory (SRAM), Synchronous Dynamic Random Access Memory (SDRAM), Dynamic Random Access Memory (DRAM), RAMBUS Dynamic Random Access Memory (RDRAM) and/or any other type of random access memory device. The non-volatile memory 1816 may be implemented by flash memory and/or any other desired type of memory device. Access to the main memory 1814, 1816 is controlled by a memory controller.

The processing system 1800 also includes an interface circuit 1820. The interface circuit 1820 may be implemented by any type of interface standard, such as an Ethernet interface, a universal serial bus (USB), and/or a PCI express interface.

One or more input devices 1822 are connected to the interface circuit 1820. The input device(s) 1822 permit a user to enter data and commands into the processor 1812. The input device(s) can be implemented by, for example, a keyboard, a mouse, a touchscreen, a track-pad, a trackball, a trackbar (such as an isopoint), a voice recognition system and/or any other human-machine interface.

One or more output devices 1824 are also connected to the interface circuit 1820. The output devices 1824 can be implemented, for example, by display devices (e.g., a liquid crystal display, a cathode ray tube display (CRT)), a printer and/or speakers. The interface circuit 1820, thus, typically includes a graphics driver card.

The interface circuit 1820 also includes a communication device, such as a modem or network interface card, to facilitate exchange of data with external computers via a network 1826 (e.g., an Ethernet connection, a digital subscriber line (DSL), a telephone line, coaxial cable, a cellular telephone system, etc.).

The processing system 1800 also includes one or more mass storage devices 1828 for storing machine readable instructions and data. Examples of such mass storage devices 1828 include floppy disk drives, hard drive disks, compact disk drives and digital versatile disk (DVD) drives.

Coded instructions 1832 corresponding to the instructions of FIGS. 6-9 may be stored in the mass storage device 1828, in the volatile memory 1814, in the non-volatile memory 1816, in the local memory 1813 and/or on a removable storage medium, such as a CD or DVD 1836.

At least some of the above described example methods and/or apparatus are implemented by one or more software and/or firmware programs running on a computer processor. However, dedicated hardware implementations including, but not limited to, application specific integrated circuits, programmable logic arrays and other hardware devices can likewise be constructed to implement some or all of the example methods and/or apparatus described herein, either in whole or in part. Furthermore, alternative software implementations including, but not limited to, distributed processing or component/object distributed processing, parallel processing, or virtual machine processing can also be constructed to implement the example methods and/or apparatus described herein.

To the extent the above specification describes example components and functions with reference to particular standards and protocols, it is understood that the scope of this patent is not limited to such standards and protocols. For instance, each of the standards for Internet and other packet switched network transmission (e.g., Transmission Control Protocol (TCP)/Internet Protocol (IP), User Datagram Protocol (UDP)/IP, HyperText Markup Language (HTML), HyperText Transfer Protocol (HTTP)) represent examples of the current state of the art. Such standards are periodically superseded by faster or more efficient equivalents having the same general functionality. Accordingly, replacement standards and protocols having the same functions are equivalents which are contemplated by this patent and are intended to be included within the scope of the accompanying claims.

Additionally, although this patent discloses example systems including software or firmware executed on hardware, it should be noted that such systems are merely illustrative and should not be considered as limiting. For example, it is contemplated that any or all of these hardware and software components could be embodied exclusively in hardware, exclusively in software, exclusively in firmware or in some combination of hardware, firmware and/or software. Accordingly, while the above specification described example systems, methods and articles of manufacture, the examples are not the only way to implement such systems, methods and articles of manufacture. Therefore, although certain example methods, apparatus and articles of manufacture have been described herein, the scope of coverage of this patent is not limited thereto. On the contrary, this patent covers all methods, apparatus and articles of manufacture fairly falling within the scope of the claims either literally or under the doctrine of equivalents.

What is claimed is:
1. A first user device, comprising:
a processor; and
a memory that stores executable instructions that, when executed by the processor, facilitate performance of operations, comprising:

sending, via a local network, a message to a second user device indicating that the first user device is available to be included in a distributed download operation to be established by the second user device with a service provider over at least one network other than the local network, wherein the distributed download operation splits a first data stream from a source into partial data streams to be distributed over respective data connections, via the at least one network, to user devices comprising the second user device, and wherein the partial data streams respectively comprise different portions of the first data stream;

establishing, via a network of the at least one network, a data connection with the service provider to receive a first partial data stream of the partial data streams; and relaying, via the local network, the first partial data stream to the second user device.

2. The first user device of claim 1, wherein the operations further comprise sending identification information of the first user device to the second user device.

3. The first user device of claim 1, further comprising a first transceiver and a second transceiver, and the operations further comprise sending the message to the second user device using the first transceiver, and establishing the data connection with the service provider using the second transceiver.

4. The first user device of claim 1, wherein the operations further comprise providing device capabilities of the first user device to the service provider in response to a request, and wherein the device capabilities comprise at least one of a bandwidth limit, a data rate limit, or a transcoding parameter associated with the first user device.

5. The first user device of claim 1, further comprising a user interface that accepts an input to cause the message to be sent to the second user device.

6. The first user device of claim 5, wherein the user interface further accepts another input comprising a status update to change whether the first user device is available for inclusion in the distributed download operation, and the operations further comprise sending, via the local network, the status update to the second user device.

7. The first user device of claim 1, wherein the operations further comprise:
accessing a second partial data stream of the partial data streams from a third user device of the user devices,
aggregating the first partial data stream and the second partial data stream to form an aggregated data stream; and
sending, via the local network, the aggregated data stream to the second user device.

8. A non-transitory machine-readable medium, comprising executable instructions that, when executed by a processor of a first electronic device, facilitate performance of operations, comprising:
sending, via a local network, a message to a second electronic device indicating that the first electronic device is available for inclusion in a distributed download operation to be established by the second electronic device with a service provider over at least one network other than the local network, wherein the distributed download operation splits a first data stream from a source into a group of partial data streams to be distributed over respective data connections, via the at least one network, to a group of electronic devices comprising the second electronic device, and wherein the partial data streams respectively comprise different portions of the first data stream;

establishing, via a network of the at least one network, a data connection with the service provider to receive a first partial data stream of the group of partial data streams; and relaying, via the local network, the first partial data stream to the second electronic device.

9. The non-transitory machine-readable medium of claim 8, wherein the operations further comprise sending identification information of the first electronic device to the second electronic device.

10. The non-transitory machine-readable medium of claim 8, wherein the operations further comprise:
sending the message to the second electronic device using a first transceiver of the first electronic device; and
establishing the data connection with the service provider using a second transceiver of the first electronic device.

11. The non-transitory machine-readable medium of claim 8, wherein the operations further comprise providing device capabilities of the first electronic device to the service provider in response to a request, and wherein the device capabilities comprise at least one of a bandwidth limit, a data rate limit, or a transcoding parameter associated with the first electronic device.

12. The non-transitory machine-readable medium of claim 8, wherein the operations further comprise presenting a user interface that accepts an input to cause the message to be sent to the second electronic device.

13. The non-transitory machine-readable medium of claim 12, wherein the user interface further accepts another input comprising a status update to change whether the first electronic device is available for inclusion in the distributed download operation, and the operations further comprise sending, via the local network, the status update to the second electronic device.

14. The non-transitory machine-readable medium of claim 8, wherein the operations further comprise:
accessing a second partial data stream of the group of partial data streams from a third electronic device,
aggregating the first partial data stream and the second partial data stream to form an aggregated data stream; and
sending, via the local network, the aggregated data stream to the second electronic device.

15. A method for a first electronic device, comprising:
sending, by a first user device, a message to a second user device indicating that the first user device is available for inclusion in a distributed download operation to be established by the second user device with a service provider over at least one network other than the local network, wherein the distributed download operation to splits a first data stream from a source into partial data streams to be distributed over respective data connections, via the at least one network, to user devices comprising the second user device, and wherein the partial data streams respectively comprise different portions of the first data stream;

establishing, by the first user device, via a network of the at least one network, a data connection with the service provider to receive a first partial data stream of the partial data; and relaying, by the first electronic device, via the local network, the first partial data stream to the second user device.

16. The method of claim 15, further comprising:
sending, by the first user device, the message to the second user device using a first transceiver of the first user device; and
establishing, by the first user device, the data connection with the service provider using a second transceiver of the first user device.

17. The method of claim 15, further comprising providing, by the first user device, device capabilities of the first user device to the service provider in response to a request, wherein the device capabilities comprise at least one of a bandwidth limit, a data rate limit, or a transcoding parameter associated with the first user device.

18. The method of claim 15, further comprising accepting, by the first user device, via a user interface, an input to cause the message to be sent to the second user device.

19. The method of claim 15, further comprising:
accepting, by the first user device, via a user interface, a status update to change whether the first user device is available for inclusion in the shared connection; and
sending by the first user device, via the local network, the status update to the second user device.

20. The method of claim 15, further comprising:
accessing, by the first user device, a second partial data stream of the partial data streams from a third user device of the user devices,
aggregating, by the first user device, the first partial data stream and the second partial data stream to form an aggregated data stream; and
sending, by the first user device, via the local network, the aggregated data stream to the second user device.

* * * * *